(12) United States Patent
Bindana et al.

(10) Patent No.: US 11,671,545 B1
(45) Date of Patent: Jun. 6, 2023

(54) METHODS AND SYSTEMS FOR ADDING SUPPORTING DOCUMENTS TO AN APPLICATION FORM

(71) Applicant: XEROX CORPORATION, Norwalk, CT (US)

(72) Inventors: Srinivasarao Bindana, Kakinada (IN); Ashok Jason Vedaraj, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/867,810

(22) Filed: Jul. 19, 2022

(51) Int. Cl.
*G06F 15/00* (2006.01)
*H04N 1/32* (2006.01)
*H04N 1/00* (2006.01)

(52) U.S. Cl.
CPC ..... *H04N 1/32122* (2013.01); *H04N 1/00225* (2013.01); *H04N 1/00424* (2013.01); *H04N 2201/0094* (2013.01)

(58) Field of Classification Search
CPC ........... H04N 1/32122; H04N 1/00225; H04N 1/00424; H04N 2201/0094
USPC ........................................................ 358/1.15
See application file for complete search history.

(56) References Cited

U.S. PATENT DOCUMENTS

| | | | |
|---|---|---|---|
| 7,702,110 B2 | 4/2010 | McCue | |
| 8,135,656 B2 | 3/2012 | Evanitsky | |
| 8,139,264 B2 | 3/2012 | Rouhana et al. | |
| 8,184,326 B2 | 5/2012 | Nagarajan | |
| 8,896,858 B2 | 11/2014 | Zehler | |
| 10,356,262 B2* | 7/2019 | Ishitori | H04N 1/00708 |
| 11,042,335 B2 | 6/2021 | Kiyose | |
| 11,176,621 B1* | 11/2021 | McDonald | G06Q 40/123 |
| 2014/0029046 A1* | 1/2014 | Ponnavaikko | G06Q 40/02 358/1.15 |
| 2015/0309978 A1* | 10/2015 | Howell | G06F 40/169 715/230 |
| 2016/0140654 A1* | 5/2016 | Bhat | G06Q 10/06316 705/7.26 |

\* cited by examiner

*Primary Examiner* — Mark R Milia

(57) ABSTRACT

The present disclosure discloses methods and systems for directly adding one or more supporting documents to an application form. The systems and methods include storing an electronic wallet of a user, including one or more supporting documents of the user. Further, the method includes receiving an application form for a pre-defined function including printing or scanning. Once received, a user interface is provided to the user to provide input on addition of the one or more supporting documents to the received application form. Thereafter, the received application form is processed. Further, based on the input from the user, one or more supporting documents and/or content of the one or more supporting documents are added to the received application form. Finally, the application form including the one or more supporting documents and/or content of the one or more supporting documents in the submitted application form is outputted.

31 Claims, 15 Drawing Sheets

METHODS AND SYSTEMS FOR ADDING SUPPORTING DOCUMENTS TO AN APPLICATION FORM

TECHNICAL FIELD

The present disclosure relates to the field of application forms, specifically, the disclosure relates to systems and methods for adding supporting documents and/or content of the supporting documents to an application form.

BACKGROUND

Usually, organizations such as banks, colleges, corporate offices, schools, recruitment agencies, passport offices, visa offices, etc., require applicants to submit filled application forms for different purposes, e.g., opening a bank account, applying for a credit/debit card, applying for a passport/visa, getting admissions in schools/colleges, or the like. An applicant fills out these application forms and submits them to the concerned organization. While filling the application form, the applicant is required to fill out various details such as name, address, nationality, gender, etc., and add supporting documents such as driving license, PAN card, SSN card, voter card, etc.

Nowadays, majority of the application forms are filled online, i.e., the applicant is required to fill the form online and submit the scanned version of the supporting documents along with the filled-out application form. In such a scenario, the applicant is required to first scan the required supporting documents and then add the scanned supporting documents along with the application form. This could be challenging especially if the applicant is required to fill out multiple application forms, as the applicant is required to scan the supporting documents again and again. For some application forms, the applicant is required to add different supporting documents at specific locations in the application form, for example, the applicant may be required to add a first supporting document, say a driving license after the $2^{nd}$ page and add a second supporting document, say a birth certificate after the $5^{th}$ page of the application form. Thus, in such a scenario the applicant is required to rearrange the supporting documents and the application form, and this requires unnecessary effort and time of the applicant.

Therefore, there is a need for improved methods and systems that can help the applicant in filling the application forms easily and conveniently.

SUMMARY

According to aspects illustrated herein, a method for integrating an electronic wallet with a multi-function device is disclosed, the method includes storing the electronic wallet with one or more supporting documents of a user. Further, the method includes receiving an application form for a pre-defined function including printing or scanning, wherein the application form includes one or more pages. Once received, a user interface is provided to the user to provide an input on addition of the one or more supporting documents to the submitted application form. Thereafter, the received application form is processed. Further, based on the input from the user, one or more supporting documents or content of the one or more supporting documents are added to the submitted application form. Finally, the application form including the one or more supporting documents or content of the one or more supporting documents in the submitted application form is outputted.

According to further aspects illustrated herein, a multi-function device for integrating an electronic wallet at the multi-function device is disclosed. The multi-function device includes a memory for storing the electronic wallet including one or more supporting documents of a user in a pre-defined format. The multi-function device further includes a user interface provided to the user to provide an input on addition of the one or more supporting documents to an application form. The multi-function device also includes a controller for receiving the application form for a pre-defined function including printing or scanning, wherein the application form includes one or more pages. The controller also performs the processing of the received application form. Further, based on the input from the user, the controller performs the adding of the one or more supporting documents or content of the one or more supporting documents to the submitted application form. Further, the controller is for outputting the application form including the one or more supporting documents or content of the one or more supporting documents in the submitted application form.

According to further aspects illustrated herein, a device for allowing a user to directly add one or more supporting documents to an application form is disclosed. The device stores an electronic wallet of a user, including one or more supporting documents of the user. Further, the device receives the application form for a pre-defined function including printing or scanning, wherein the application form includes one or more pages. Thereafter, the device provides a user interface to the user to provide an input on addition of the one or more supporting documents to the submitted application form. Once received, the device scans the received application form. Further, based on the input from the user, the device adds the one or more supporting documents or content of the one or more supporting documents to the submitted application form. Finally, the device outputs the application form including the one or more supporting documents or content of the one or more supporting documents in the submitted application form.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
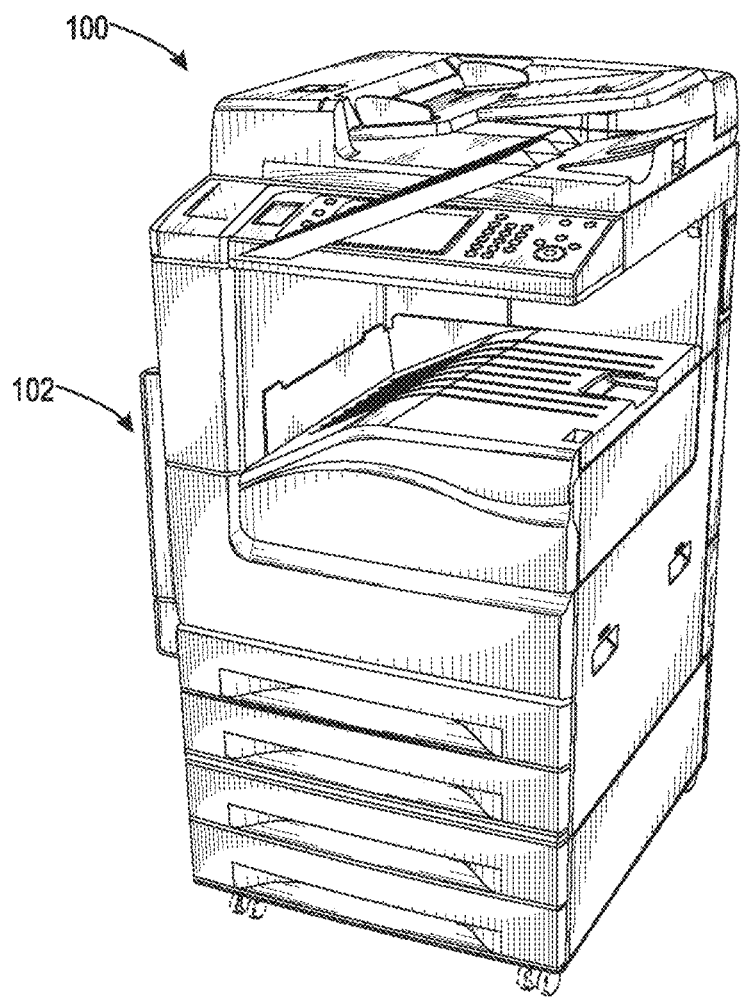
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, or the like. The multi-function device may include software, hardware, firmware, or a combination thereof. In the context of current disclosure, the multi-function device allows a user to directly add one or more supporting documents and/or content of the supporting documents to an application form. Specifically, the multi-function device facilitates the integration of an electronic wallet (e-wallet) with one or more workflows at the multi-function device such that the user can store the supporting documents within the e-wallet and add required supporting documents and/or content of the supporting documents to the application form.

The term "application form" refers to a form filled out by the user for different purposes in various organizations such as banks, colleges, schools, passport offices, etc. For example, the application form may be needed for opening a bank account, getting admission to schools/colleges, applying for a passport, applying for a visa, etc. Each application form includes various fields such as "Applicant Name", "Father's Name", "Age", "Nationality", "Gender", "Photo", or the like. These fields are filled-out by the user. The application form may be filled online by the user via an online portal. Alternatively, the application form may be filled offline by the user via pen, pencil, etc.

The term "supporting documents" refers to pre-verified documents issued to the user by various governing bodies such as government agencies, education boards, universities, bank agencies, or the like. Various examples of the supporting documents may be a driving license, SSN (Social Security Number) card, birth certificate, passport, mark sheets, passing certificates, etc. The supporting documents include various details or content related to the user (owner of the supporting document), exemplary details include name, date of birth, address, and the like.

The term "electronic wallet" refers to a storage space provided on the multi-function device for storing supporting documents for the user and the supporting documents can be any scanned documents of the user including a driving license, a voter card, an SSN card, and the like.

As used herein, the term 'processing' refers to any action performed on an application form submitted by the user to add one or more supporting documents and/or content of the one or more supporting documents to the application form. For example, the application form is processed to identify the pages and/or locations where the supporting documents are to be added and/or content of the supporting documents are to be added. Further, the processing can be performed on the application form in any format.

The user refers to any user who wishes to store his supporting documents at the multi-function device specifically, in the e-wallet at the multi-function device. In context of the current disclosure, the user wants to add the supporting documents and/or content of the supporting documents to an application form, using the e-wallet feature at the multi-function device.

Overview

The present disclosure discloses methods and systems that allow a user to directly add one or more supporting documents and/or content of the one or more supporting documents to an application form at a multi-function device. The methods and systems integrate an electronic wallet with one or more workflows at the multi-function device. The electronic wallet stores multiple supporting documents such as a driving license, SSN card, birth certificate, passport, or the like. The supporting documents are stored in the electronic wallet in any desired format for later retrieval, access and/or use. Before submitting any application form, the user can directly add the supporting documents required to be submitted with the filled out application form.

This way, the methods and systems provide an efficient, automatic, and convenient way of adding supporting documents and/or their content to the application form.

Exemplary Environment

FIG. 1 shows an exemplary environment 100 in which various embodiments of the disclosure can be practiced. The environment 100 includes a multi-function device 102. Various examples of the multi-function device (MFD) 102 may be a printer, a scanner, a multi-function peripheral device, or the like. The multi-function device 102 provides one or more functionalities such as printing, scanning, imaging, copying, and so on. In context of the present disclosure, the multi-function device 102 provides an electronic wallet feature that allows integration of an electronic wallet (e-wallet) with one or more workflows at the multi-function device 102 such as scan to email workflow, scan to store workflow, scan workflow, and so on. The e-wallet stores supporting documents and the multi-function device 102 allows a user to add any stored support documents directly from the electronic wallet to an application form.

Typically, users are required to fill out various application forms for various purposes, for example, to open bank accounts, apply for gas connections, apply for a passport and visa, get admission in educational institutes, or the like. The application forms include various fields such as "Applicant Name", "Father's Name", "Age", "Address", "Qualification", "Gender", etc., corresponding to which the users are required to fill in their details. Before submitting any application forms, the users are required to submit supporting documents such as a driving license, voter ID card, or the like.

The supporting documents are pre-verified documents issued to the applicant by various governing bodies such as government agencies, education boards, banks, and the like. Exemplary supporting documents include a driving license, an SSN card, a voter card, a birth certificate, a graduation degree, a passport, etc. The supporting documents can be any scanned documents. The supporting documents include various fields such as "NAME", "Date of Birth", "Address", etc., and details provided corresponding to the fields, e.g., name of an applicant, say John, provided corresponding to the filed "NAME". Further, the supporting documents are required to support the correctness of details filled in the application forms by applicants, and these may vary based on the details required to be filled in the application form. For example, a supporting document required to support the age or date of birth may be a high-school certificate, birth certificate, etc. In another example, a supporting document required to support nationality may be a passport, voter card, etc. In context of the current disclosure, the supporting documents are stored in the electronic wallet at the multi-function device 102.

To begin with, a user first stores one or more supporting documents in the electronic wallet. Once stored, the user can use the electronic wallet to add the one or more supporting documents and/or content of the supporting documents in any application form.

In operation, the user submits a filled-out application form at the multi-function device 102. The application form can be a digital application form or can be a physical application form. For example, the user can submit the digital application form directly from his computing device (not shown) via Internet services, such as CentreWare Internet Services (CWIS). In another example, the user can submit the physical application form directly at the multi-function device 102. Here, the user submits the physical application form at the multi-function device 102.

Once submitted, the user provides input for the addition of one or more supporting documents and/or content of the one or more supporting documents to the application form. Various examples of the input may include a selection of required supporting documents to be added, pages of the application form on which the supporting documents are required to be added, whether the content of the supporting documents are required to be added, pages of the application form where the content of the supporting document is required to be added, and so on. Here, the user provides input on the addition of one or more supporting documents, i.e., the supporting documents to be added and the pages of the application form on which the supporting documents are required to be added. After providing the input, the user initiates scanning.

Once initiated, the multi-function device 102 scans the application form and obtains the scanned/digital application form. Also, the multi-function device 102 obtains the user input related to the addition of one or more supporting documents. Once the scanned application form and the user input are received, the multi-function device 102 retrieves the supporting documents requested by the user from the electronic wallet. Thereafter, the multi-function device 102 adds the supporting documents to the scanned application form based on the user input and generates an output application form.

Although, the environment 100 is explained with respect to a scenario where the user wishes to add the one or more supporting documents and thus provides input related to the addition of one or more supporting documents. However, the disclosure can be implemented in a scenario where the user wishes to add the supporting documents as well as the contents, thus the user provides input related to addition of both the supporting documents and the content of the supporting documents. In such scenario, once the user input and scanned application form are received, the multi-function device 102 retrieves the supporting document requested by the user. Thereafter, the multi-function device 102 analyzes the retrieved supporting documents to extract the content of the supporting documents that are required to be added. Further, the multi-function device 102 analyzes the scanned application form to identify the fields of the application form corresponding to which the content of supporting documents are required to be added. Thereafter, the multi-function device 102 adds the one or more supporting documents and content of the one or more supporting documents to the application form based on the user input.

Further, the disclosure can also be implemented in a scenario where the digital application form is submitted at the multi-function device 102, instead of the physical application form. In such scenario, the user submits a filled out digital application form from his computing device (not shown) and while submitting, the user provides input on the addition of the one or more supporting documents and/or content of the one or more supporting documents. Once the user submits the application form, the multi-function device 102 receives the digital application form and the user input on the addition of the one or more supporting documents. Then, as explained earlier, the multi-function device 102 obtains the requested supporting documents and adds the supporting documents and/or content of the supporting documents to the application form based on the user input.

This way, the multi-function device 102 adds the one or more supporting documents and/or content of the supporting documents to the application form based on the user input. Once added, the multi-function device 102 creates an output application form that includes one or more supporting documents and/or content of the supporting documents added to the submitted application form based on the user input.

For example, if an application form is a 5-page application form, and the user input includes adding a supporting document, say driving license after the $5^{th}$ page and adding content of the supporting document on $5^{th}$ page of the application form. Then, the multi-function device 102 creates a 6-page output application form in which the supporting document, i.e., driving license is added as the $6^{th}$ page and content of the supporting document, say driving license number is added on the $5^{th}$ page.

Exemplary System

Figure 2A:
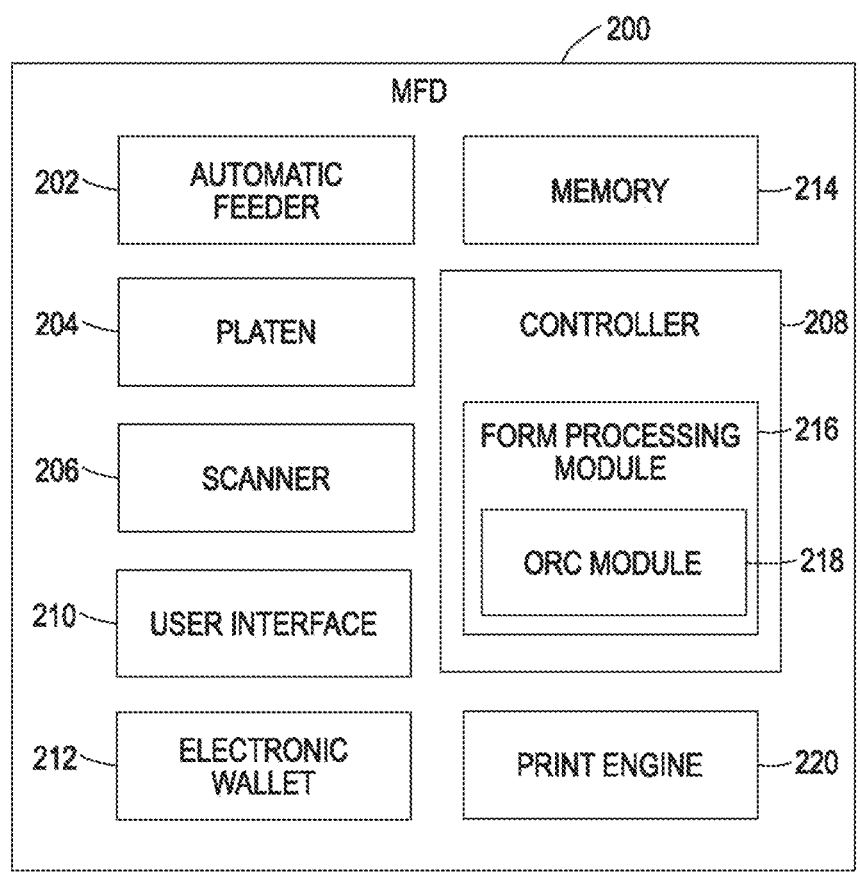
FIG. 2A is a block diagram illustrating various components of a multi-function device, in accordance with an embodiment of the present disclosure.

FIG. 2A is a block diagram illustrating various components of a multi-function device (MFD) 200 for implementing the current disclosure. As shown, the multi-function device 200 includes an automatic feeder 202, a platen 204, a scanner 206, a controller 208, a user interface 210, an electronic wallet (e-wallet) 212, a memory 214, a form processing module 216 including an OCR module 218, and a print engine 220 to perform various functions. The components 202-220 are connected to each other via a conventional bus or a later developed protocol. And the components 202-220 communicate with each other for performing various functions of the present disclosure. The multi-function device 200 may further include additional component(s) as required to implement the present disclosure. The multi-function device 200 may perform functions and operations similar to the multi-function device 102 of FIG. 1.

Figure 3A:
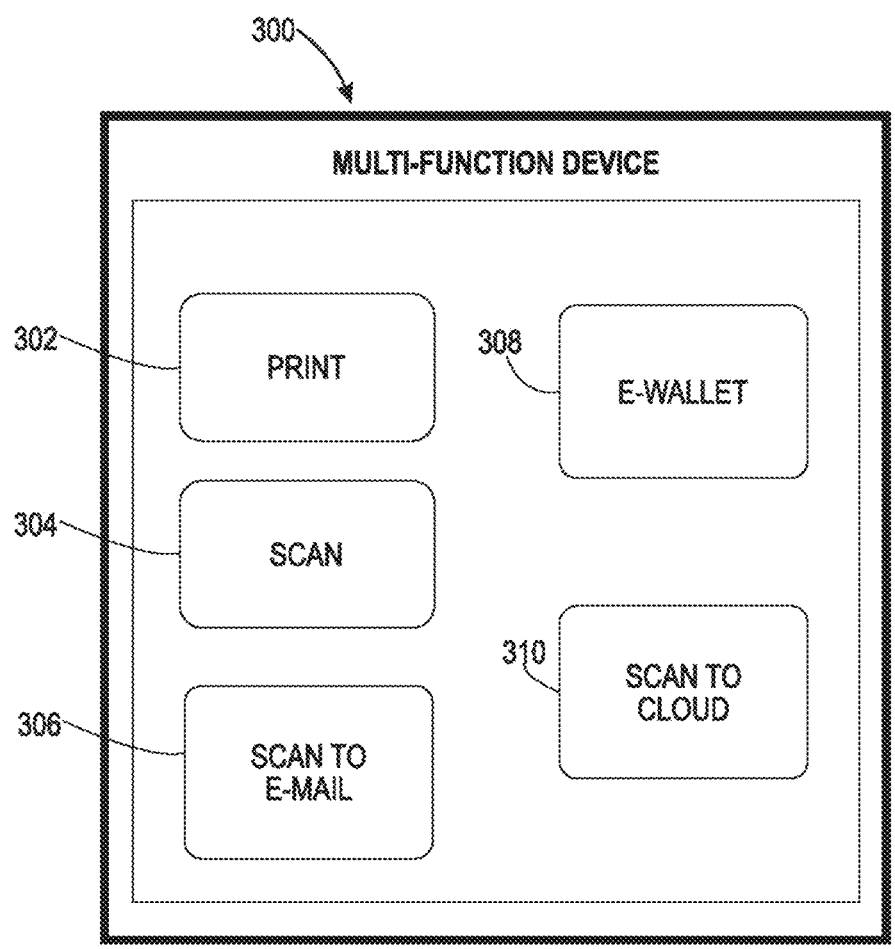
FIGS. 3A-3J show exemplary snapshots of user interfaces, in accordance with an embodiment of the present disclosure.

Initially, a user is required to add one or more supporting documents to the electronic wallet 212. Thus, the user visits the multi-function device 200 and authenticates himself at the multi-function device 200 using any known methods, such as scanning his ID card, using his employee ID and password, etc. Once authenticated, the user interface 210 displays various options such as scan, scan to email, scan to cloud, or the like. In the context of the disclosure, the user interface 210 displays a new option, say "e-wallet" option to allow the user to add one or more supporting documents in the electronic wallet 212. One such exemplary user interface 300 is shown in FIG. 3A. As illustrated, the user interface 300 displays various options such as print (labeled as 302), scan (labeled as 304), scan to e-mail (labeled as 306), e-wallet (labeled as 308), and scan to cloud (labeled as 310).

Once the user selects the new option, i.e., the "e-wallet" option, the user interface 210 displays a pre-defined encryption option. The option ensures that the documents/data stored in the wallet (e-wallet) 212 is secure and cannot be accessed by anyone else, i.e., other than the owner of the supporting documents and/or the user who adds the supporting documents to the electronic wallet 212. The user can select the option or the multi-function device 200 enables the option by default. In case the option is not enabled by default and the user also does not enable the option, then the user interface 210 may notify the user to enable the option. In one example, if the user does not enable the option and the option is not enabled by default, the controller 208 does not allow the user to access the e-wallet 212 and/or add the supporting documents. This way, the multi-function device 200 ensures that all the data/documents stored in the e-wallet 212 are encrypted and thus safe from unauthorized access.

Figure 3B:
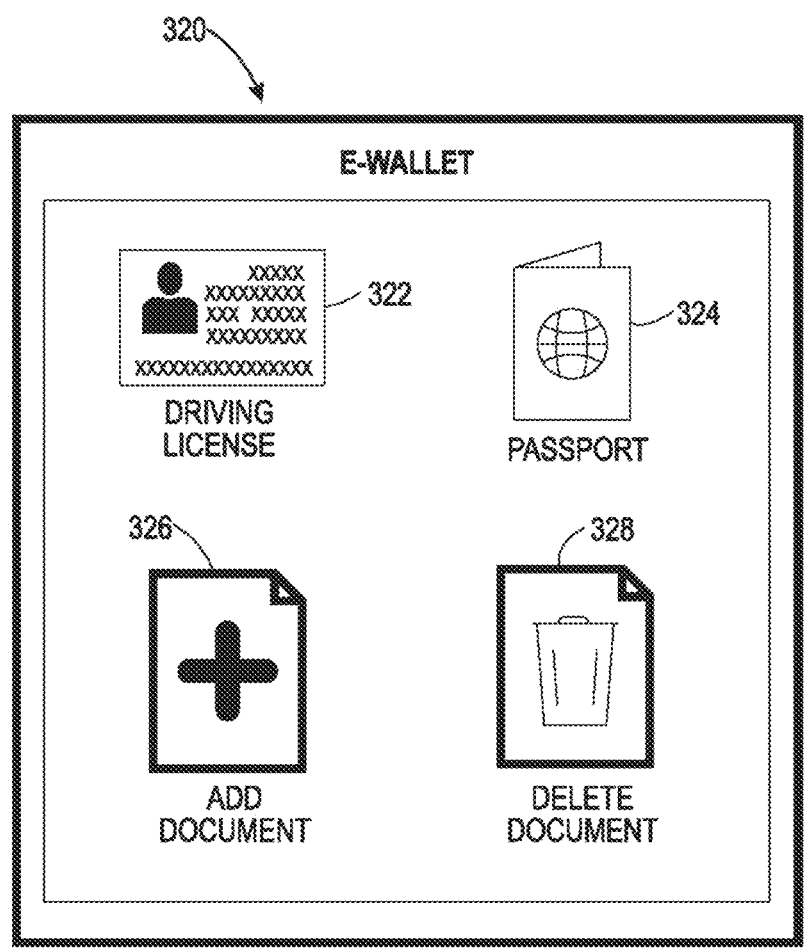

Thereafter, the user interface 210 displays additional options to allow the user to add one or more supporting documents. In one example, the additional options include an option, say "add by scan" option, to allow the user to add physical supporting documents by scanning the supporting documents at the multi-function device 200. In another example, the additional options include an option, say "add from cloud" option, to allow the user to import digital supporting documents from a cloud location, and so on. This way, the user adds the supporting documents to the electronic wallet 212. Once added, the user interface 210 displays the supporting documents to the user. In one example, the user interface 210 displays a preview of the supporting documents added by the user and the name of the corresponding supporting documents. In another example, the multi-function device 200 automatically identifies the name of the supporting document. In yet another example, the multi-function device 200 prompts the user to add the name of the supporting documents while/after adding the corresponding supporting documents. One such exemplary user interface 320 is shown in FIG. 3B. As illustrated, the user interface 320 displays the supporting documents, i.e., a driving license (labeled as 322) and a passport (labeled as 324) added by the user. Further, the user interface 320 displays "Add Document" option (labeled as 326) and "Delete Document" option (labeled as 328) to allow the user to add one or more supporting documents and delete one or more already added supporting documents, respectively. This way, the user adds supporting documents in the electronic wallet 212. Once the user successfully adds all the supporting documents to the electronic wallet 212, the user can use the multi-function device 200 to add the one or more added/stored supporting documents and/or content of the supporting documents to the one or more application forms. Once the supporting documents are successfully added to the electronic wallet 212, the controller 208 encrypts the supporting documents such that they cannot be accessed by anyone else, i.e., other than the owner of the supporting documents and/or the user who adds the supporting documents to the electronic wallet 212.

The implementation begins when the user fills out a physical version of an application form and submits the filled out application form at the multi-function device 200. The application form may be a multi-page application form. In one example, the application form is duly signed. In another example, the application form is blank. In yet another example, the application form is partially filled. Further, the user may submit the application form by placing the pages of the application form one by one on the platen 204 or the automatic feeder 202. Alternatively, the user may submit all the pages of the application form at the automatic feeder 202 in one go.

Figure 3C:
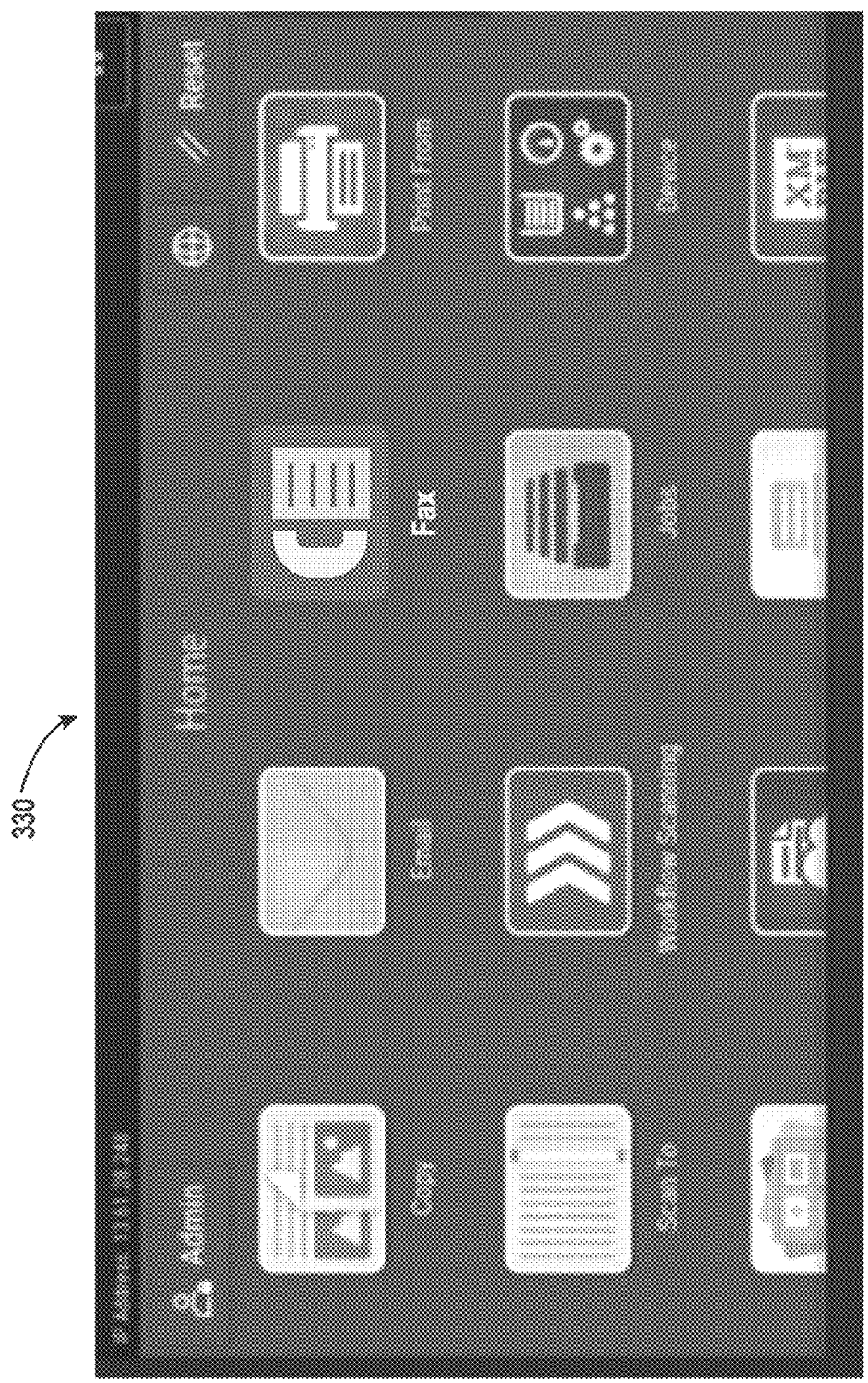
Figure 3D:
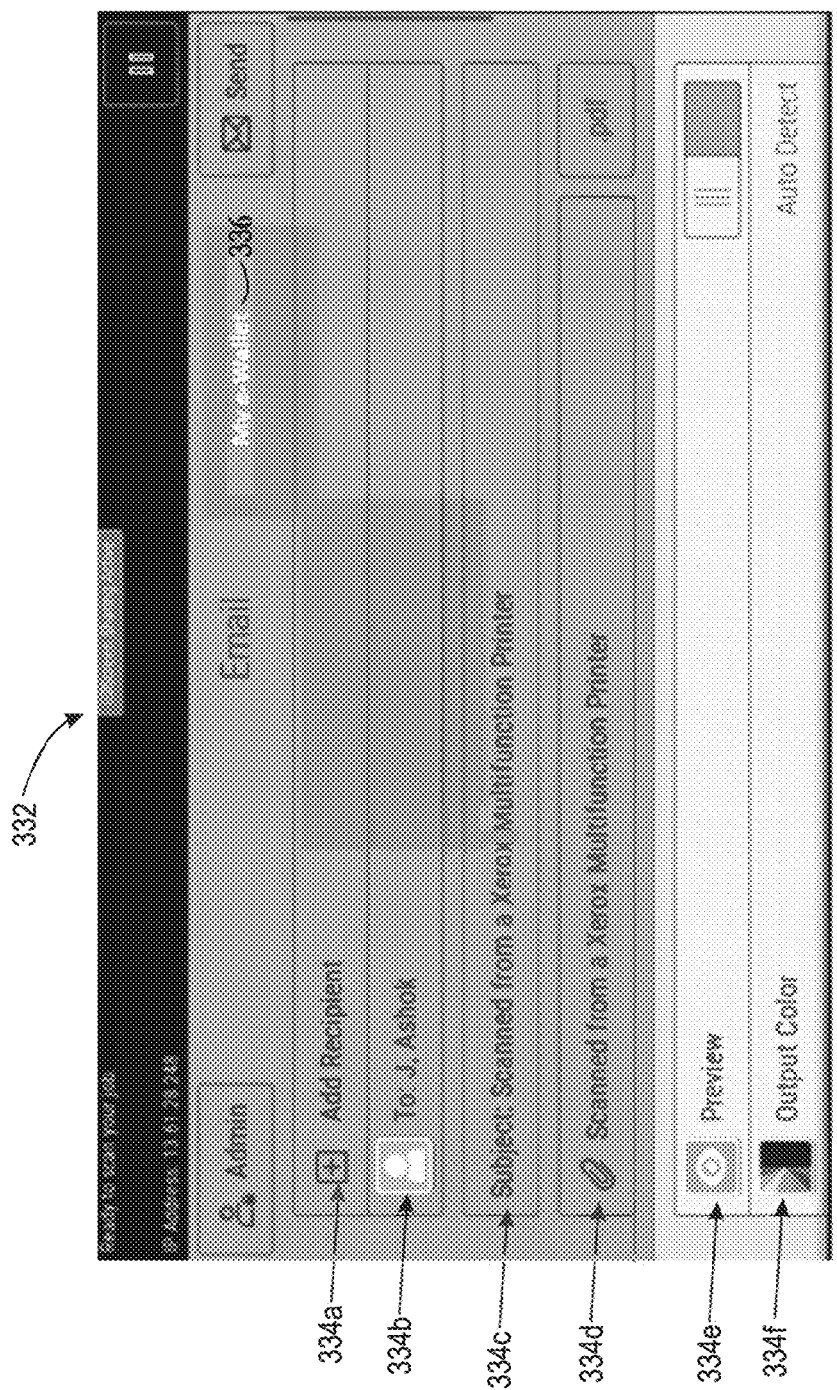
Figure 3E:
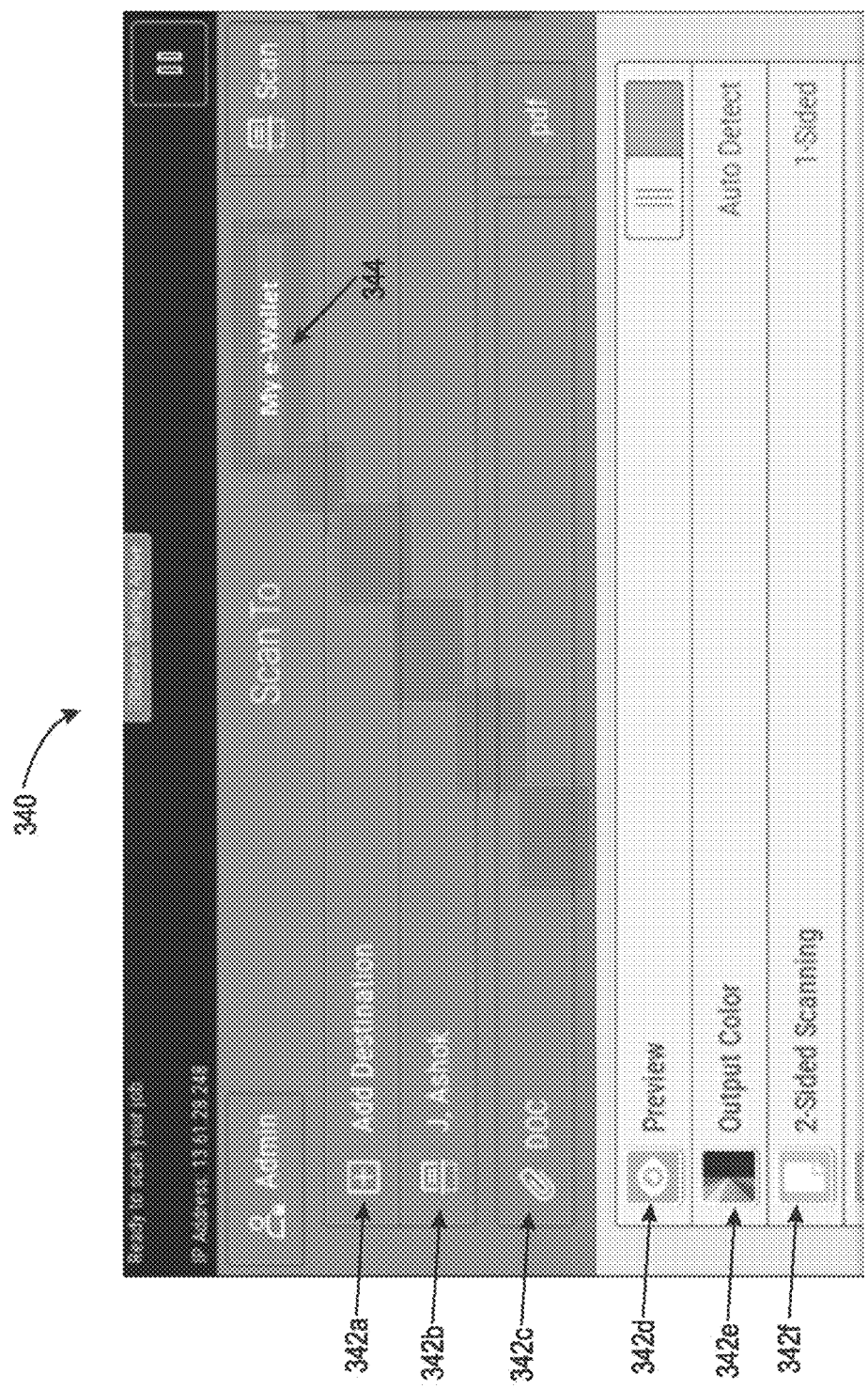

Thereafter, the user authenticates himself at the multi-function device 200 using any known methods, such as scanning his ID card, using his employee ID and password, etc. Once successfully authenticated, the user interface 210 displays various options such as scan, print, scan to email, scan to cloud, or the like, to allow the user to perform the desired action. One such exemplary user interface 330 is shown in FIG. 3C. Once displayed, the user selects an option, e.g., the scan option, to scan the application form. Once selected, the user interface 210 displays additional options to allow the user to configure parameters related to the scan option. Exemplary additional options include scan resolution, file type to be created, or the like. In the context of the disclosure, the user interface 210 displays a new option, e.g., "electronic wallet" or "my e-wallet", to allow the user to access the e-wallet associated with the account of the user and provide input on the addition of one or more pre-stored supporting documents. FIG. 3D illustrates a user interface 332 which is presented to the user once the user selects the email option. The user interface 332 displays various conventional options such as 334a, 334b, 334c, 334d, 334e and 334f to allow the user to configure parameters related to e-mail. Further, the user interface 332 displays a new option "My e-Wallet" labeled as 336, to allow the user to access the e-wallet and provide input on the addition of one or more pre-stored supporting documents. Similarly, FIG. 3E illustrates a user interface 340 which is presented to the user once the user selects the scan option. The user interface 340 displays various conventional options such as 342a, 342b, 342c, 342d, 342e and 342f to allow the user to configure scan-related parameters. Further, the user interface 340 displays a new option "My e-Wallet" labeled as 344, to allow the user to access the e-wallet and provide input on the addition of one or more pre-stored supporting documents. Here, after selecting the scan option and the user selects the e-wallet option.

Figure 3F:
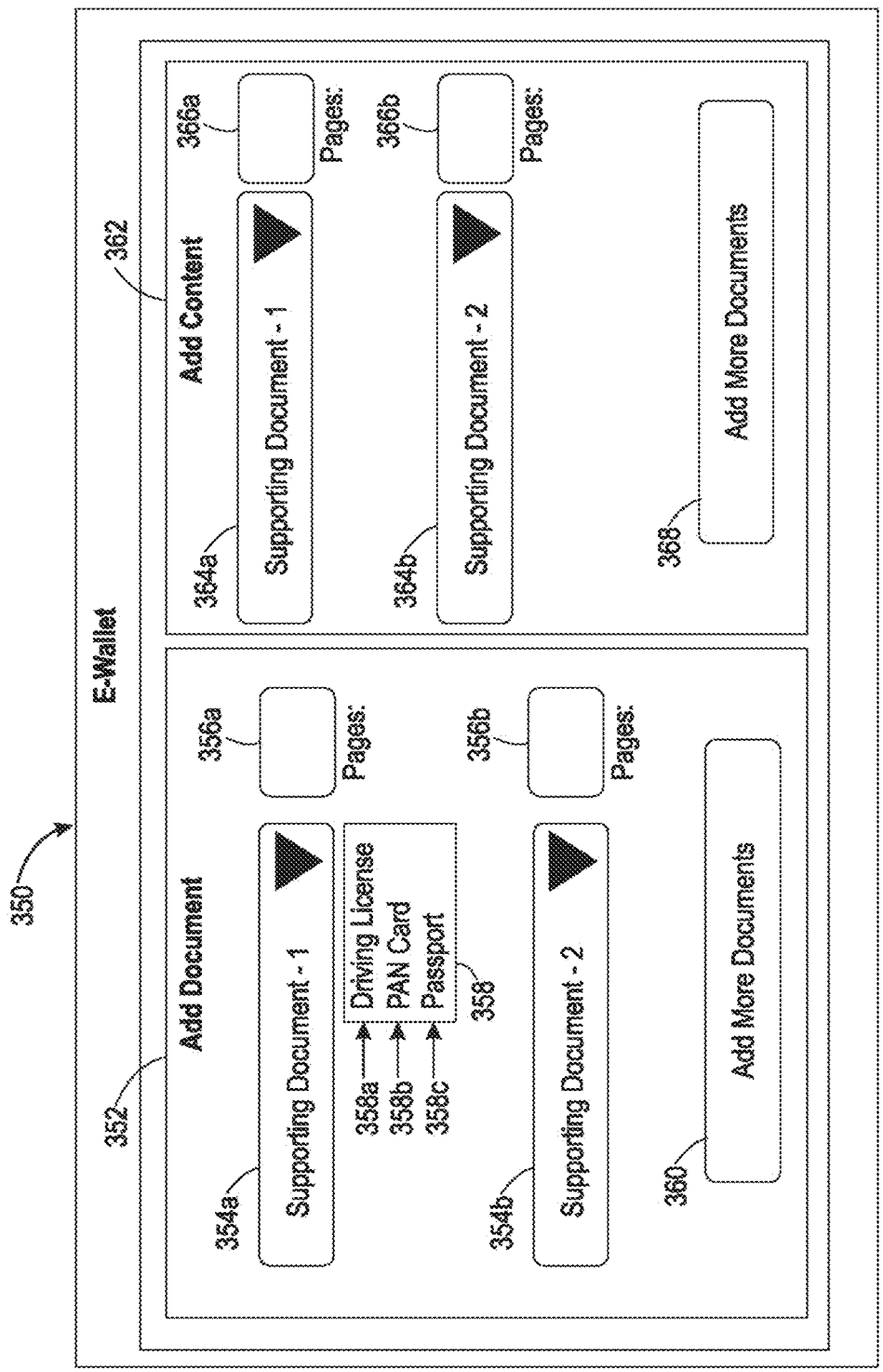

Once selected, the user interface 210 displays options to allow the user to provide input on the addition of one or more supporting documents and/or content of the one or more supporting documents. Various examples of options include options to select required supporting documents to be added, options to specify pages of the application form on which the supporting documents are required to be added, options to specify whether the content of the supporting documents is required to be added, options to specify the pages of the application form where the content of the supporting documents are required to be added, and so on. One exemplary user interface 350 is shown in FIG. 3F. As illustrated, the user interface 350 includes "Add Document" Option 352 and "Add Content" option 362. The add document option 352 allows the user to select and add one or more supporting documents to the application form. For example, if the user wishes to add only the PAN card to the application form and not the content of the PAN card, then the user selects the add document option 352. The add document option 352 includes supporting document options labeled as 354a and 354b to allow the user to select one or more supporting documents to be added. In one example, the options 354a and 354b can be a drop-down, and once selected, a list 358 of all the supporting documents 358a, 358b, 358c, etc., pre-stored in the electronic wallet 212 is displayed to the user. Once displayed, the user can select a desired supporting document from the displayed list 358. Further, the add document option 352 includes pages option 356a and 356b provided corresponding to the options 354a and 354b, respectively, to allow the user to specify the pages of the application form where the supporting documents (selected using the options 354a and 354b, respectively) are required to be added. For example, for a 5-page application form, if the user wishes to add a PAN card and a driving license after the $3^{rd}$ page and $5^{th}$ pages of the application form, respectively, then the user selects the supporting document-1 option 354a and selects a PAN card 358b, and enters '3' in the pages option 356a. Further, the user selects the supporting document-2 option 354b and selects driving license 358a, and enters '5' in the pages option 356b. Additionally, the add document option 352 includes add more documents option labeled as 360 to allow the user to add more documents, i.e., if the user wishes to add three supporting documents, then the user selects the add more document option 360 and once selected, new options (not shown), i.e., supporting document-3 and a corresponding pages options are displayed.

The add content option 362 allows the user to select one or more supporting documents from which the content or details (present in the supporting document) are required to be added to the application form. For example, if the user wishes to add content such as PAN from the PAN card to the application form, the user selects the add content option 362. The add content option 362 also includes supporting document options 364a and 364b to allow the user to select one or more supporting documents from which the content is required to be added to the application form. Further, the add content option includes pages options 366a and 366b provided corresponding to the options 364a and 364b, respectively to allow the user to specify the pages of the application form where the content of the supporting documents (selected using the options 364a and 364b, respectively) are required to be added. For example, for a 3-page application form, if the user wishes to add PAN from the PAN card on a $2^{nd}$ page of the application form, then the user selects the supporting document-1 option 364a and selects a PAN card, and enters '2' in the pages option 366a. Additionally, the add content option 362 includes add more documents option labeled as 368 to allow the user to add more documents from which the content is required to be added to the application form.

Figure 3G:
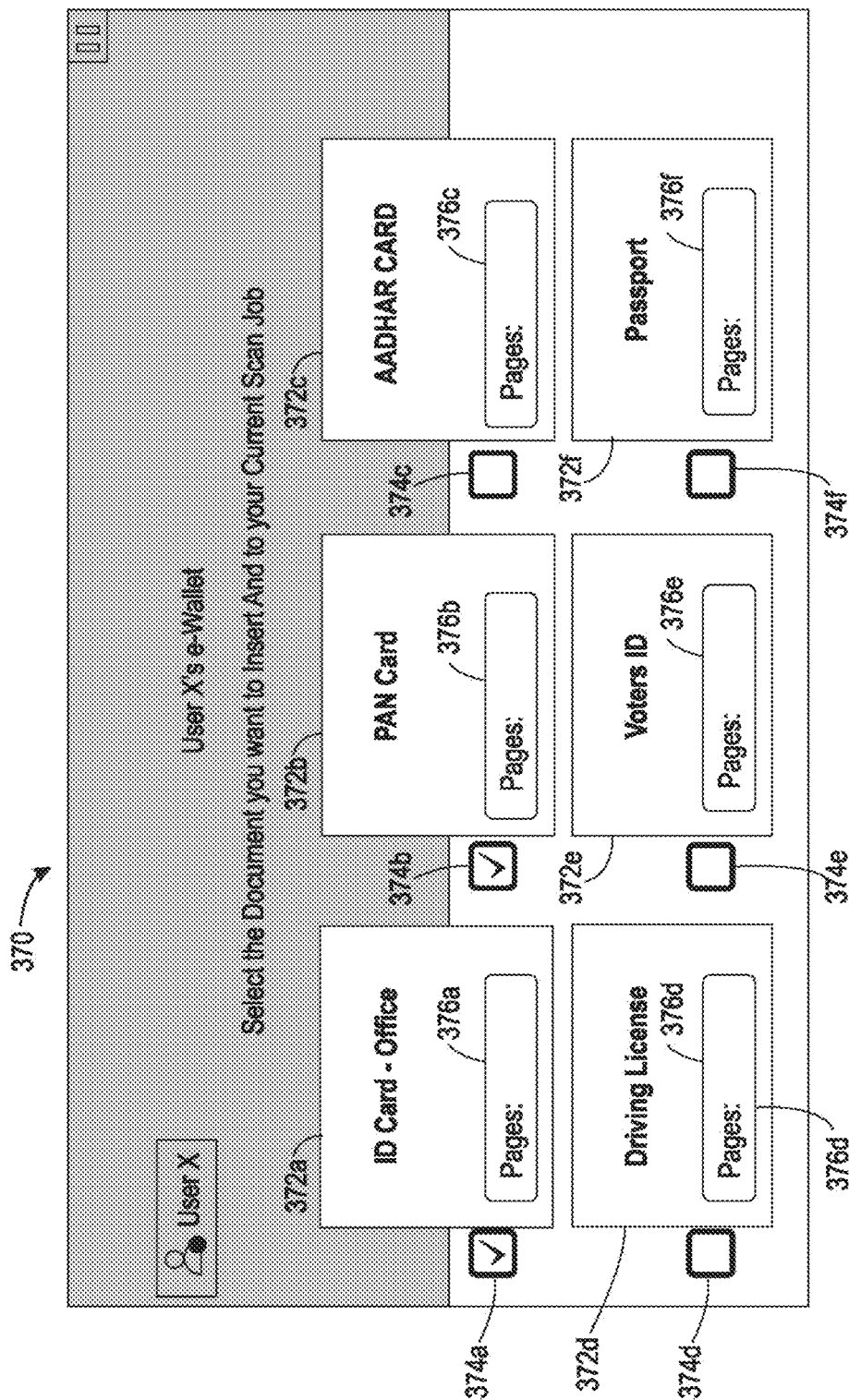

FIG. 3G is a snapshot of another exemplary user interface 370, which is displayed to the user when the user selects the new option, say "My e-Wallet" to select and add one or more supporting documents to the application form. As illustrated, the user interface 370 displays all the stored supporting documents such as 372a, 372b, 372c, 372d, 372e, 372f. Further, corresponding to each supporting document 372a, 372b, 372c, 372d, 372e, 372f, pages options 376a, 376b, 376c, 376d, 376e, 376f, (collectively 376) are provided respectively. The pages option 376 are provided to allow the user to specify the page number of the application form where the user wishes to add the supporting documents. Additionally, checkboxes 374a, 374b, 374c, 374d, 374e, 374f, (collectively 374) are provided corresponding to each supporting document 372a, 372b, 372c, 372d, 372e, 372f, respectively. The checkboxes 374 are provided to allow the user to select or unselect the supporting documents that the user wishes to add. This way, the user provides input related to the addition of one or more supporting documents and/or content of one or more supporting documents. Here, the user provides input related to the addition of one or more supporting documents, i.e., the supporting documents to be added and the pages of the application form on which the supporting documents are required to be added. After providing the input, the user initiates scanning, e.g., by selecting "proceed" option or "scan" option.

Once initiated, the controller 208 obtains the user input related to the addition of one or more supporting documents, further the controller 208 triggers the scanner 206 to scan the application form. Once triggered, the scanner 206 scans all the pages of the application form submitted by the user in one go and generates a scanned application form. Thereafter, the controller 208 forwards the scanned application form and the user input related to the addition of one or more supporting documents to the form processing module 216.

Once received, the form processing module 216 analyzes the user input to identify the supporting documents requested by the user and pages of the application form where the identified supporting documents are required to be added. Thereafter, the form processing module 216 retrieves the identified supporting documents from the electronic wallet 212. Once retrieved, the form processing module 216 adds the retrieved supporting documents to the scanned application form based on the user input. Thus, the form processing module 216 creates an output application form which includes the scanned application form and the supporting documents selected by the user. Further, the supporting documents and the pages of the scanned application form are arranged according to the input provided by the user. For example, if an application form is a 4-page application form, and user input includes adding a driving license after the $2^{nd}$ page and adding an education certificate after the $4^{th}$ page of the application form. Then, the form processing module 216 creates a 6-page output application form in which 4 pages correspond to the application form and 2 pages correspond to the supporting documents (i.e., driving license and the education certificate). Further, the pages are arranged such that in the output application form $1^{st}$ and $2^{nd}$ pages correspond to the $1^{st}$ and $2^{nd}$ pages of the application form, $3^{rd}$ page of the output application form is the driving license, the $4^{th}$ and $5^{th}$ pages of the output application form correspond to the $3^{rd}$ and $4^{th}$ pages of the application form, and the $6^{th}$ page of the output application form is the education certificate. This way, the form processing module 216 creates a 6-page application form.

Although, the FIG. 2A is explained with respect to the scenario where the user wishes only to add the supporting documents and thus provides input related to the addition of one or more supporting documents. However, the disclosure can be implemented in a scenario where the user wishes to add the supporting documents as well as the contents of the supporting documents, thus the user provides input related to addition of both the supporting documents as well as the content of the supporting documents. In such scenario, after submitting the application form at the multi-function device 200, the user provides input related to the addition of both the supporting documents as well as the content of the supporting documents. Thus, the user provides required input, e.g., by selecting appropriate options (as discussed in FIG. 3F). Here, the user input includes the supporting documents to be added and the pages of the application form on which the supporting documents are required to be added, indication that both the content and documents are required to be added, supporting documents from which the content are required to be added, pages of the application form where the content of the supporting documents are required to be added, and so on. After providing the input, the user initiates scanning, e.g., by selecting "proceed" option or "scan" option.

Once initiated, the controller 208 obtains the user input related to the addition of one or more supporting documents and the content of the one or more documents. Further, the controller 208 triggers the scanner 206 to scan the application form. Once triggered, the scanner 206 scans all the pages of the application form submitted by the user in one go and generates a scanned application form. Thereafter, the controller 208 forwards the scanned application form and the user input to the form processing module 216.

Once received, the form processing module 216 analyzes the user input and identifies that both the supporting documents as well as the content of the supporting documents are required to be added. Thus, the form processing module 216 identifies all the supporting documents requested by the user, i.e., supporting documents that are required to be added and the supporting documents from which the content is also required to be added, and retrieves the identified supporting documents from the electronic wallet 212. Once retrieved, the form processing module 216 triggers the OCR module 218 to analyze the retrieved supporting documents and the scanned application form. The OCR module 218 analyzes the scanned application form and the supporting documents to extract information from the scanned application form and the supporting documents. Here, the OCR module 218 only analyzes the supporting documents from which the content is required to be added. Further, the OCR module 218 only analyzes and extracts the information from the pages of the application form in which the details of the supporting documents are required to be added and the pages are identified based on the user input. Once analyzed, the OCR module 218 extracts the fields from the scanned application form, i.e., the fields which are required to be filled or auto-filled and content from the supporting documents which are required to be added.

In addition, the OCR module 218 extracts other details provided on the application form, e.g., organization name, form name, form ID, form type, form reference number, etc. Similarly, the OCR module 218 extracts other details provided on the supporting documents, e.g., type of supporting document, i.e., whether the supporting document is a driving license, a PAN card, passport, or the like, expiration date of the supporting document, etc. Post successful extraction, the OCR module 218 sends the extracted content of the application form and the extracted content of the supporting documents to the form processing module 216.

The form processing module 216 receives the extracted content (fields and other information) of the application form and the extracted content (details and other information) of the supporting document. Upon receiving, the form processing module 216 identifies the correspondence between the fields extracted from the application form and the details extracted from the supporting documents. To accomplish this, the form processing module 216 first identifies the type of the supporting document and various details present in the supporting documents. In one example, the form processing module 216 may identify the type of the supporting document based on the extracted content such as the name of the document. In another example, the form processing module 216 may identify the type of the supporting document by comparing the supporting document with pre-stored templates of the multiple supporting documents. Once the type of the supporting document is identified, i.e., whether the supporting document is an SSN card, a driving license, passport, etc., the form processing module 216 recognizes specific details extracted from the supporting document, i.e., whether the extracted content is a driving license number, an SSN, name of the user, etc. The form processing module 216 is trained to recognize the extracted details. For example, once the form processing module 216 identifies that the supporting document is an SSN card, then the form processing module 216 automatically identifies that the 10-digit number present on the SSN card is SSN, a character string below the SSN is a declaration, and character string further below is the name of the user. In another example, the multi-function device 200 may prompt the user to provide the details related to the supporting document when the user adds the supporting document in the electronic wallet 212. This way, the form processing module 216 extracts the details and information related to the details extracted from the supporting documents, i.e., whether the detail is a user's name, or user's date of birth, SSN, etc. Once extracted, the details are saved in the memory 214 for future use, i.e., while adding the details in other application forms or documents.

Similarly, the form processing module 216 identifies information related to the fields extracted from the application form. The form processing module 216 analyzes the content extracted from the application form and identifies the type of the field, i.e., whether the field relates to the name of the user, or the name of the user's father, SSN, etc. For example, after analyzing the content extracted from the scanned pages of the application form, the form processing module 216 identifies that the field "Applicant' Name" relates to the name of the user, "Age" relates to the date of birth of the user, or the like. This way, the form processing module 216 obtains the information related to the fields extracted from the application form, i.e., whether the field relates to user's name, or the user's date of birth, SSN, etc.

Once the details are extracted from the supporting documents and the information related to the extracted details are obtained, and fields extracted from the application form and information related to the extracted fields are obtained, the form processing module 216 adds the details extracted from the supporting documents to the application form. To this end, the form processing module 216 first identifies the correlation between the details extracted from the supporting document and the fields extracted from the application form. The form processing module 216 identifies the correlation based on the information obtained related to the extracted details and the extracted fields. For instance, if the information related to the extracted field indicates that the field relates to SSN, then the form processing module 216 adds the detail that relates to the SSN (i.e., 10 digit number) extracted from the supporting document that includes SSN (i.e., SSN card), i.e., 10-digit number extracted from the SSN card. Further, the fields which are required to be filled or auto-filled are may be pre-determined based on the type of application form and/or the type of supporting document from which the content is to be added. For instance, if an application form is a bank form and the supporting document is a PAN card, then it is pre-determined that the field "PAN" of the application form is to be filled and the detail related to the PAN (i.e., PAN number) extracted from the supporting document PAN card is filled corresponding to the field PAN of the application form.

This way, the form processing module 216 adds the details/content of the supporting documents to the application form based on the user input. Once the content is added, the form processing module 216 adds the supporting documents including supporting documents from which content is not required to be added and the supporting documents from which the content is required to be added to the scanned application form based on the user input. In one example, after adding the details, the form processing module 216 automatically adds the supporting document as a consecutive page in the output application form. For instance, if details of the driving license are added on the $2^{nd}$ page of the application form, then the driving license is added as the $3^{rd}$ page. In another example, after adding the details, the form processing module 216 adds the supporting documents at the end of the scanned application form. For instance, in a 5-page application form, if details of the PAN card are added on the $2^{nd}$ page of the application form, then the PAN card is added after the $5^{th}$ page of the application form. This way, the form processing module 216 creates an output application form which is created by adding one or more supporting documents and details present in the supporting document, to the scanned application form, based on the user input.

Once created, the controller 208 obtains the created document and displays a preview of the document to the user on the user interface 210. The user interface 210 may display a preview of all the pages of the output document so that the user can review the output document and/or details filled corresponding to various fields. Thereafter, the user can take any desired action, such as, share the document with one or more other users by entering email addresses, save the document on a cloud location, or the like. Further, the user can print the document by simply placing the print request, and once placed, the print engine 220 prints the document. Thereafter, the user can sign the application form and send it to the desired organization for submission.

Continuing with FIG. 2A description, the memory 214 stores all relevant information required for implementing the current disclosure. For example, the memory 214 stores the electronic wallet which further stores the supporting documents added by the user. Further, the memory 214 may store information related to the supporting document, i.e., identification of supporting document, details present in the supporting documents, etc. Any details stored in the memory 214 may be retrieved by the form processing module 216 or other components for implementing the current disclosure.

Figure 2B:
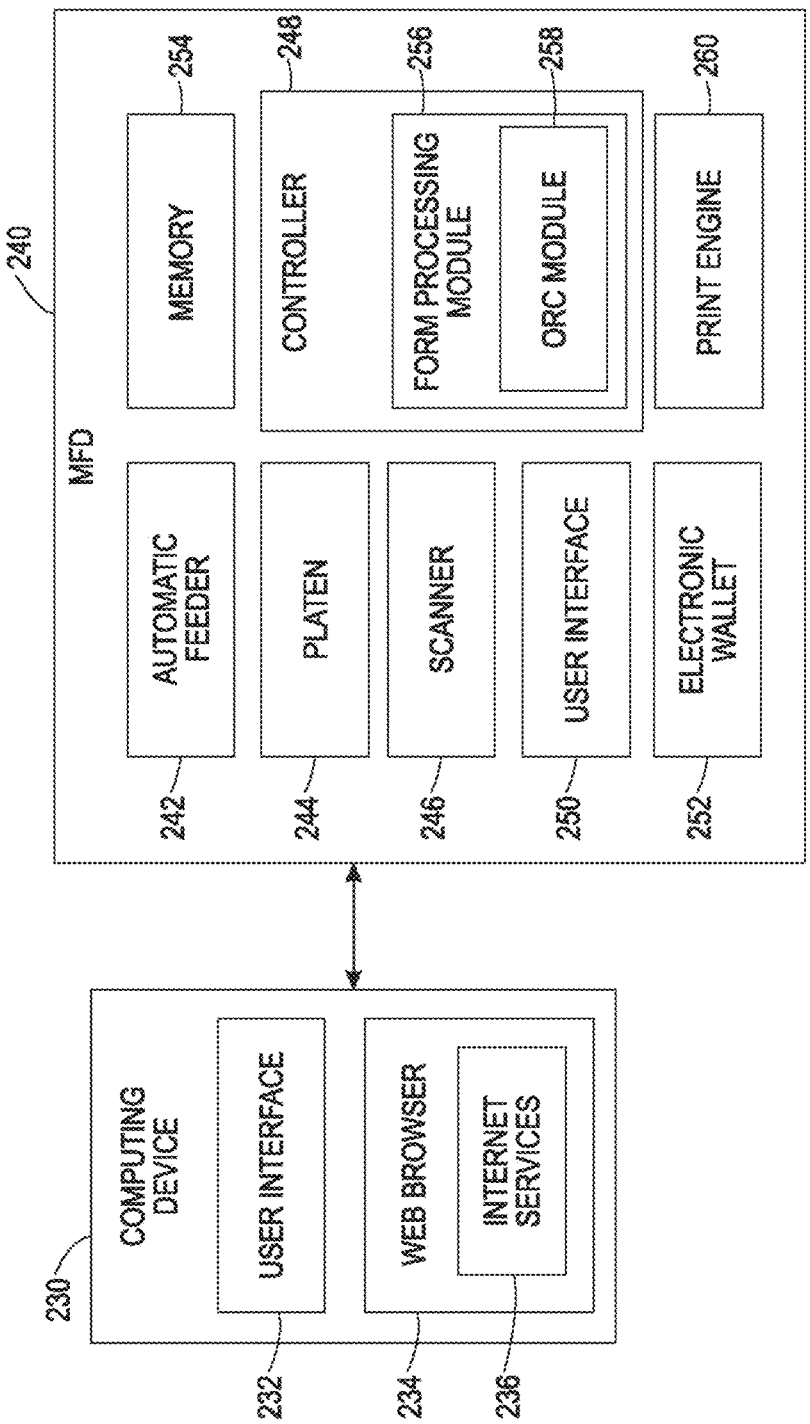
FIG. 2B is a block diagram illustrating various components of a multi-function device and a computing device, in accordance with an embodiment of the present disclosure.

FIG. 2B illustrates block diagrams of a computing device 230 and a multi-function device (MFD) 240, for implementing the current disclosure. FIG. 2B is explained with respect to a scenario where the user submits a digital application form at the multi-function device 240 using the computing device 230.

As illustrated, the computing device 230 includes a user interface 232 and a web browser 234 including internet services 236. The computing device 230 is communicatively coupled to the multi-function device 240 via a communication network (although not shown) to perform various tasks such as sending or receiving print jobs, sending or receiving notifications, or any other tasks required for implementing the current disclosure. Although not shown explicitly, the computing device 230 may further include additional component(s) as required to implement the present disclosure. Further, the multi-function device 240 includes an automatic feeder 242, a platen 244, a scanner 246, a controller 248, a user interface 250, an electronic wallet (e-wallet) 252, a memory 254, a form processing module 256 including an OCR module 258 and a print engine 260 to perform various functions. The components 242-260 are connected to each other via a conventional bus or a later developed protocol. And the components 232-260 communicate with each other for performing various functions of the present disclosure. The multi-function device 240 may further include additional component(s) as required to implement the present disclosure. Also, the multi-function device 240 may perform functions and operations similar to the multi-function devices discussed in FIGS. 1 and 2A.

Figure 3H:
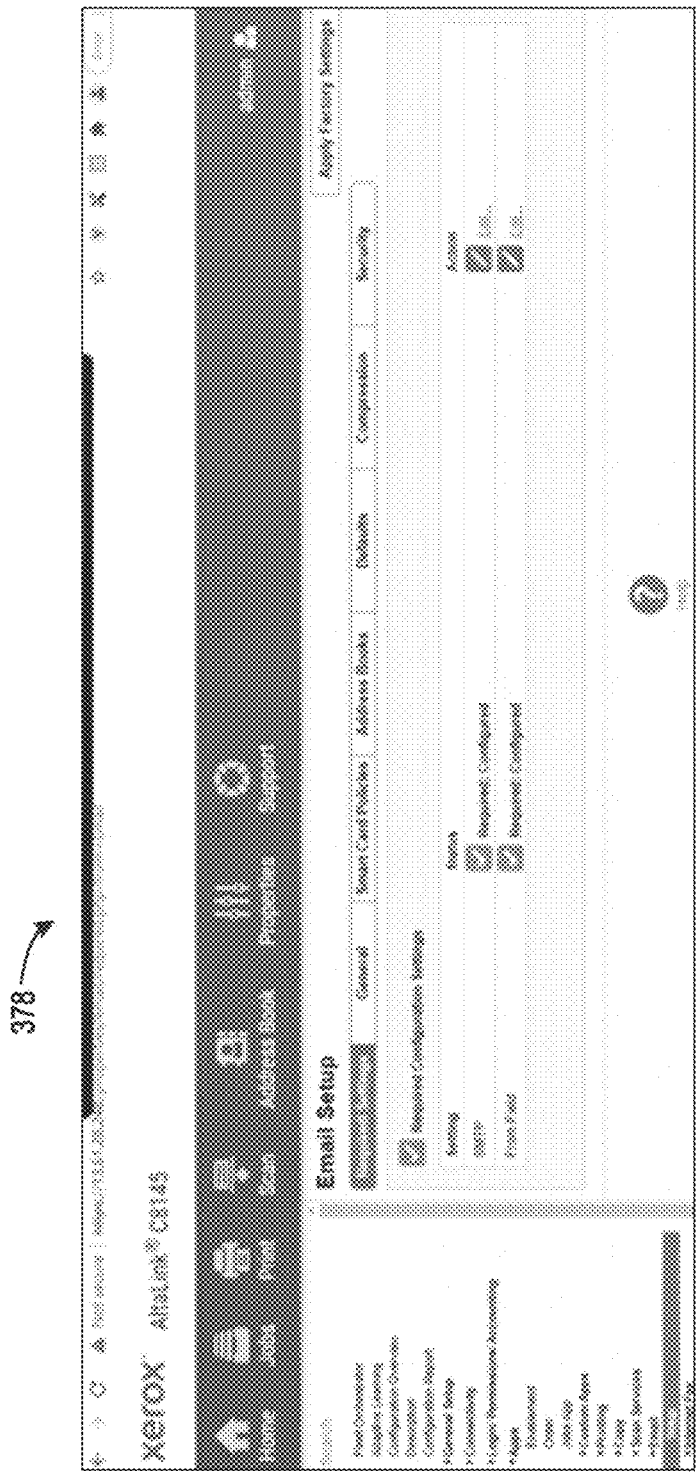

Referring back to the computing device 230, which runs several applications and software to perform various functions. One such example is the web browser 234. The web browser 234 allows the user to surf different websites via the user interface 232. Further, in the context of the disclosure, the web browser 234 includes the internet services 236, such as CentreWare Internet Services (CWIS), which allow the user to remotely access the multi-function device 240 and configure various parameters associated with the multi-function device 240 such as default tray, default print type, i.e., colored or black and white print, or the like. One such exemplary user interface 378 is shown in FIG. 3H. The user interface 378 allows the user to configure various parameters associated with e-mail services.

Further, the internet services 236 allow the user to select and submit a digital application form for printing. Additionally, in the context of the disclosure, the internet services 236 allow the user to add one or more supporting documents and/or content of the one or more supporting documents to the application form. To this end, the user is required to add one or more supporting documents to the electronic wallet 252 at the multi-function device 240. As discussed earlier (in FIG. 2A), the user adds the one or more supporting documents to the electronic wallet 252 either by scanning the physical version of the one or more supporting documents or by uploading digital versions of the one or more supporting documents from a storage location such as cloud storage. Once added, the user can add the one or more supporting documents and/or content of the one or more supporting documents to the application form.

Figure 3I:
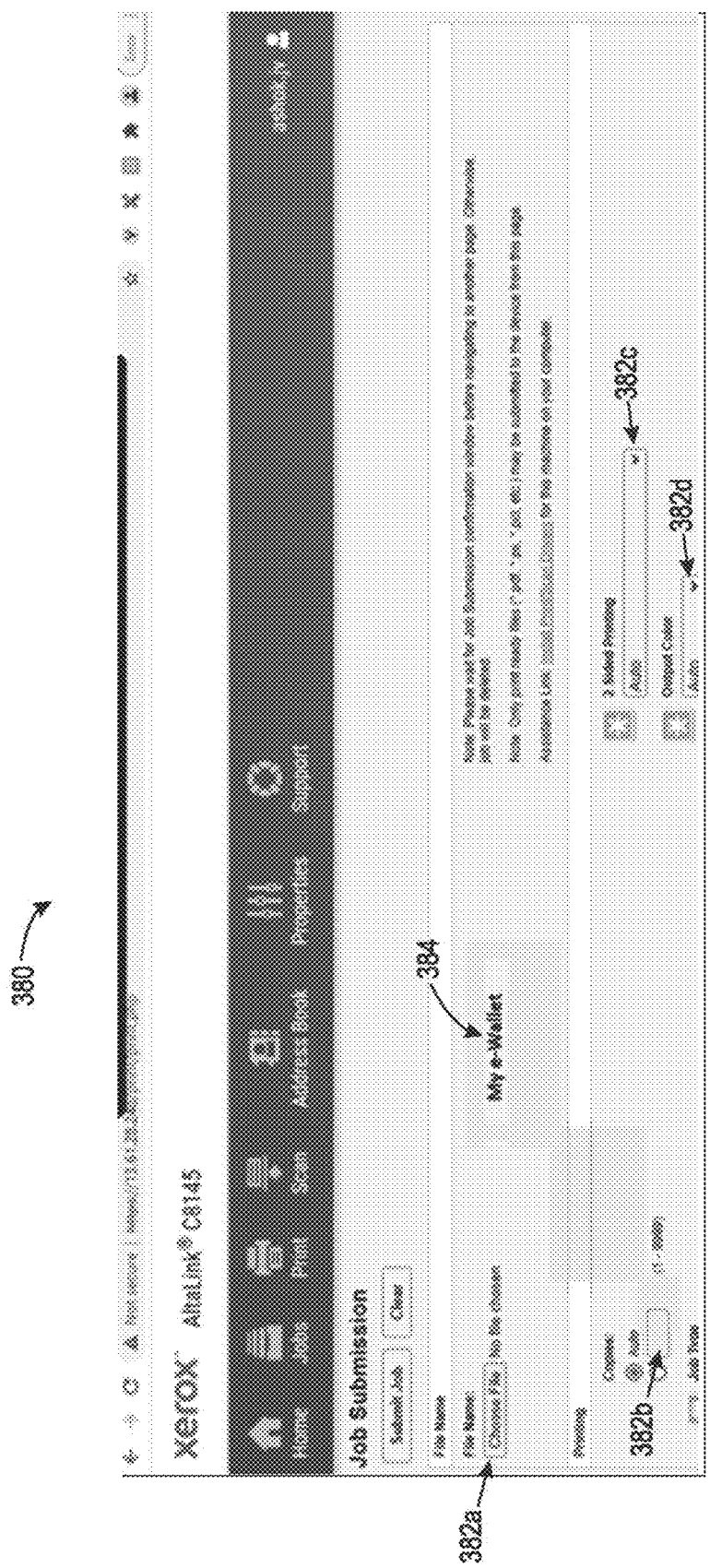

In implementation, the user fills out a digital version of the application form. Thereafter, the user accesses the web browser 234, specifically, the internet services 236 to select and submit the filled out digital application form and add one or supporting documents and/or content of the one or more supporting documents to the application form. Once accessed, the user authenticates himself using any known methods, such as using his employee ID and password, phone number and one-time password, etc. Once successfully authenticated, the user interface 232 displays various conventional options to allow the user to configure parameters, such as single sided/double sided, output color, or the like. Further, the user interface 232 displays a new option, say "My e-Wallet" option, to allow the user to access the electronic wallet 252 and provide input on the addition of one or more pre-stored supporting documents and/or content of the one or more supporting documents. One such exemplary user interface 380 is shown in FIG. 3I. As illustrated, the user interface 380 displays various conventional options such as 382a, 382b, 382c, and 382d to allow the user to configure parameters related to the application form that the user wishes to submit. Further, the user interface 380 displays a new option "My e-Wallet" labeled as 384, to allow the user to access the e-wallet and provide input on the addition of one or more pre-stored supporting documents.

Once selected, the user interface 232 displays additional options to allow the user to provide input related to the addition of the one or more supporting documents and/or content of the one or more supporting documents. Thus, the user provides the required input, e.g., by selecting appropriate options (as discussed in FIG. 3F). Once the user provides the desired input related to the addition of the one or more supporting documents and/or content of the supporting documents, the user submits the application form for further processing, maybe by selecting proceed option (not shown). Once selected, the multi-function device 240 receives the digital application form and the user input related to the addition of one or more supporting documents and/or content of one or more supporting documents to the application form.

Once received, the controller 248 communicates and sends the digital version of the application form and information related to user input (regarding the addition of one or more supporting documents and/or content of one or more supporting documents) to the form processing module 256 for further processing.

Once received, the form processing module 256 analyzes the user input and adds the one or more supporting documents and/or content of the one or more supporting documents to the digital application form based on the user input.

This way, the form processing module 256 creates an output application form which is created by adding one or more supporting documents and/or content of the one or more supporting documents to the application form based on the user input.

Once created/generated, the controller 248 obtains the created document and sends the created document to the internet services 236. Once received, the internet services 236 display a preview of the document to the user on the webpage of the internet services 236. The webpage may display a preview of all the pages of the output document so that the user can review the output document and/or details filled corresponding to various fields. Once displayed, the user can take any desired action, such as, download the document on the computing device 230, send the document to a recipient or concerned department, print the document, or the like.

Figure 3J:
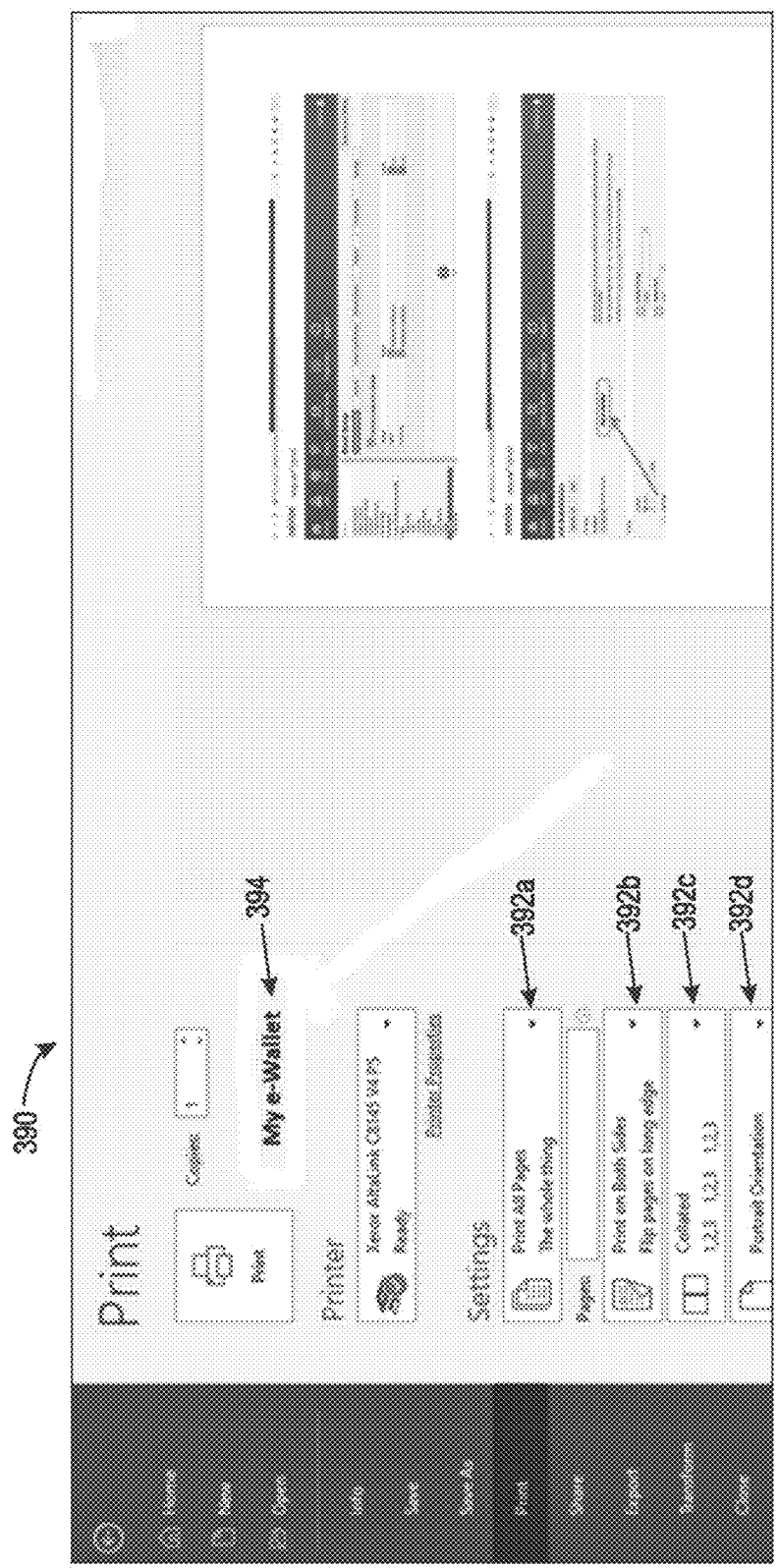

Although, the FIG. 2B is explained with respect to a scenario where the digital application form is submitted via a web browser 234 (using the internet services 236) of the computing device 230. However, the disclosure can be implemented in a scenario where the digital application form is submitted via a print driver (not shown) installed on the computing device 230. In such a scenario, once the user fills out the application form and selects the print option, the user interface 232 displays various conventional options such as pages to be printed, single sided/double sided print, orientation, or the like. Further, the user interface 232 presents a new option, say "my e-Wallet" to allow the user to select and add one or more supporting documents to the application form. One such exemplary user interface 390 is shown in FIG. 3J. The user interface 390 is presented to the user once the user selects an application form for printing. The user interface 390 displays various conventional options such as 392*a*, 392*b*, 392*c*, and 392*d* to allow the user to configure print parameters related to the application form. Further, the user interface 390 displays a new option "My e-Wallet" labeled as 394, to allow the user to provide input related to the addition of the one or more supporting documents. This way, the user can provide input related to the addition of one or more supporting documents to the application form.

Once the user provides desired input related to the addition of the one or more supporting documents and submits the application form for printing, the multi-function device 240 receives the application form, and the user input related to the addition of the one or more supporting documents. Thereafter, the multi-function device 240 creates an output application form that includes supporting documents and the application form submitted by the user, and the supporting documents are added based on the user input. In one example, if the user input indicates that the user selected the new option (i.e., my e-wallet), then the multi-function device 240 creates the output application form such that the application form includes all the supporting documents pre-stored in the electronic wallet of the user and the supporting documents are added at the end of the application form. Once the output application form is generated, the controller 248 triggers the print engine 260 to print the document.

Exemplary Flowcharts

Figure 4:
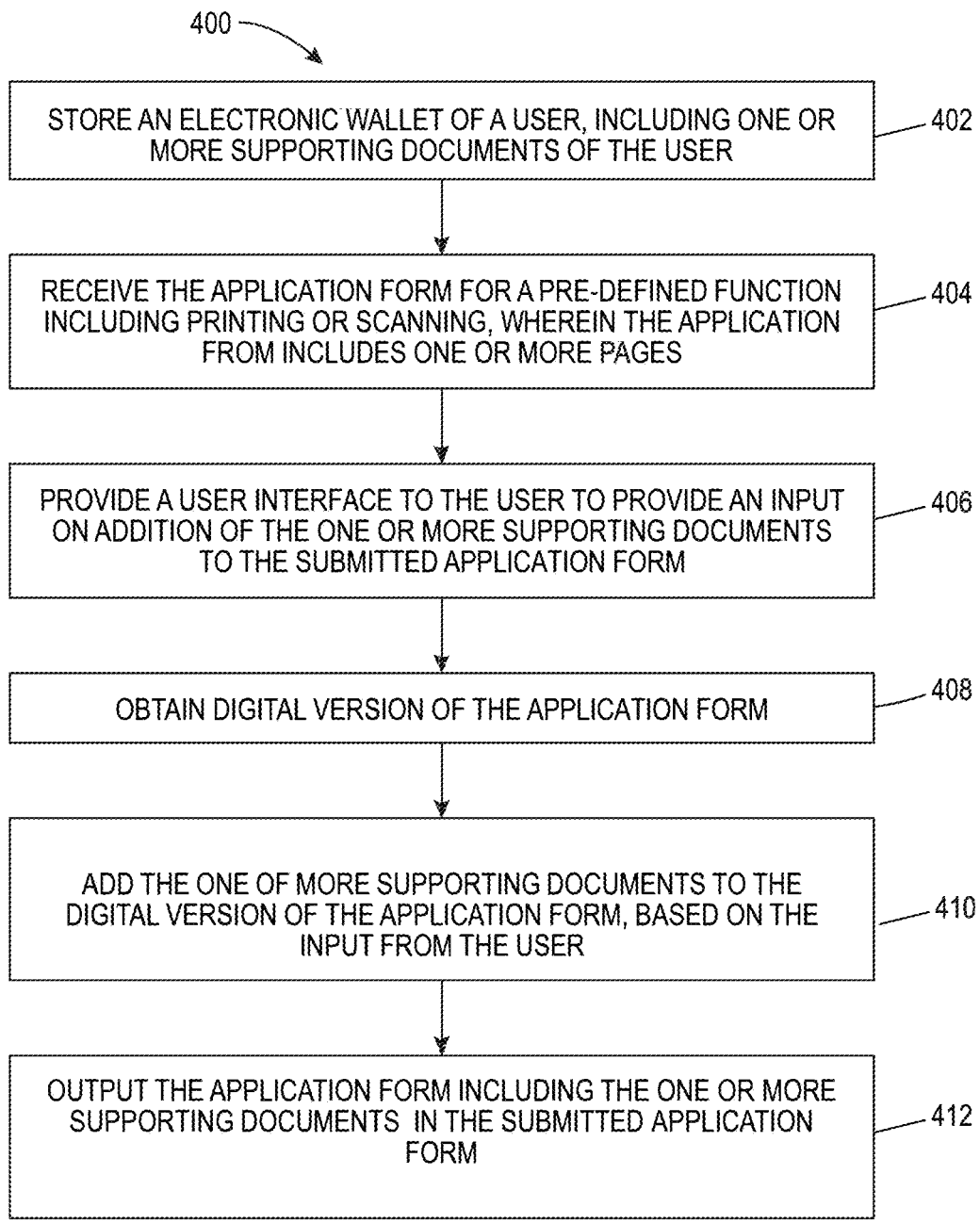
FIG. 4 is a method flowchart for directly adding one or more supporting documents to an application form, in accordance with an embodiment of the present disclosure.

FIG. 4 is a method flowchart that allows a user to directly add one or more supporting documents to an application form. The method 400 may be implemented at a multi-function device, such as the multi-function device 102 of FIG. 1, or the multi-function device 200 of FIG. 2A, or the multi-function device 240 of FIG. 2B. However, the method 400 can be implemented at any equivalent device with scanning, printing, form processing functionalities, and so on.

The method 400 begins when a user wishes to add one or more supporting documents to an electronic wallet integrated with the multi-function device. Thus, the user visits the multi-function device and authenticates himself at the multi-function device using any known methods, such as scanning his ID card, using his employee ID and password, etc. Once authenticated, the multi-function device displays various options such as scan, scan to email, scan to cloud, or the like. In the context of the disclosure, the multi-function device displays a new option, say "e-wallet" option to allow the user to add one or more supporting documents in the electronic wallet. Thereafter, the user selects the new option and adds supporting documents to the electronic wallet. The user may add the physical versions of the supporting documents by scanning them at the multi-function device. Otherwise, the user may directly add the supporting documents to the electronic wallet. For example, the user may access any location such as a cloud location, and select and add the supporting document from the cloud location to the electronic wallet. Further, once the user selects the new option, i.e., "e-wallet" option, a pre-defined encryption option is displayed to the user. The option ensures that the documents/data stored in the wallet are secure and cannot be accessed by anyone other than the owner of the supporting documents and/or the user who adds the supporting documents to the electronic wallet. The user can enable the option or by default the option is enabled. In case the option is not enabled by default and the user also does not enable the option, then the user can be notified to enable the same. In one example, if the user does not enable the option and the option is not enabled by default, the multi-function device does not allow the user to access the e-wallet and/or add the supporting documents. This way, the security of all the data/documents stored in the e-wallet is ensured. Thereafter, at 402, the electronic wallet with one or more supporting documents of the user is stored. While/before storing, the supporting documents are encrypted using one or more known encryption algorithms or later developed algorithms. Encrypting the supporting documents ensures that the documents or any content of the electronic wallet cannot be accessed by any unauthorized user/software/device and further ensures that the personal information of the user is secured. This way, the supporting documents are stored and maintained in the electronic wallet for later retrieval, use and/or access.

Later, the user submits the application form at the multi-function device. The user may submit the application form in physical form, i.e., physical application form printed on paper, or may submit the application form in digital form, i.e., electronic application form. In case of the physical application form, the user submits the application form directly at the multi-function device. In other cases, the user submits the application form via his computing device or via using internet services such as CentreWare Internet Services (CWIS). Here the application form is a filled-out application form where all required details are filled out by the user. Further, the application form is a physical application form and the user submits the physical application form at the multi-function device for a pre-defined function including printing or scanning. Once submitted, at block 404, the application form is received at the multi-function device. The application form can be a multi-page application form. In one example, the application form is duly signed. Thereafter, the user authenticates himself at the multi-function device using any known methods, such as scanning his ID card, using his employee ID and password, etc.

Thereafter, at 406, a user interface is presented to the user to provide input on the addition of the one or more supporting documents to the submitted application form. The user interface displays multiple options to allow the user to provide the input. Exemplary options include options to allow the user to specify different supporting documents that are required to be added and pages of the application form on which the supporting documents are required to be added. Once presented, the user provides input on the addition of the one or more supporting documents. Once the user provides the input on the addition of the one or more supporting documents, the user selects an option, say proceed or scan option. Thereafter, the multi-function device initiates processing.

Once initiated, at 408, a digital version of the application form is obtained. Here, as the physical application form is submitted at the multi-function device, thus scanning is performed and a scanned application form, i.e., a digital version of the application form is obtained. Alternatively, if the digital version of the application form is submitted from the computing device, then the digital version of the application form is obtained directly. This way, the digital version of the application form is obtained.

Once obtained, at 410, the one or more supporting documents are added to the application form, based on the input from the user. For instance, if an application form is a 4-page application form and the user input includes adding a driving license after the $2^{nd}$ page, then the driving license is added after the $2^{nd}$ page of the application form.

Once added, at 412, an output application form/document is generated that includes supporting documents and the application form, and the supporting documents are added based on the user input. For instance, if a user submits a 5-page application form, and the user input includes adding the SSN card after the $3^{rd}$ page of the application form, then a 6-page output application form is created. In the output application form, the first 3 pages correspond to the first 3 pages of the application form, the $4^{th}$ page of the output application form is the SSN card, and the $5^{th}$ and $6^{th}$ pages of the output application form are the $4^{th}$ and $5^{th}$ pages of the application form. This way, the output application form is created such that the output application form includes the one or more supporting documents in the submitted application form.

In some cases, the user may delete or remove the electronic wallet, or the supporting documents stored therein. In such cases, the method 400 implements overwriting a memory (memory location) that stores the supporting documents if the electronic wallet or the supporting documents are stored locally at the multi-function device.

Figure 5:
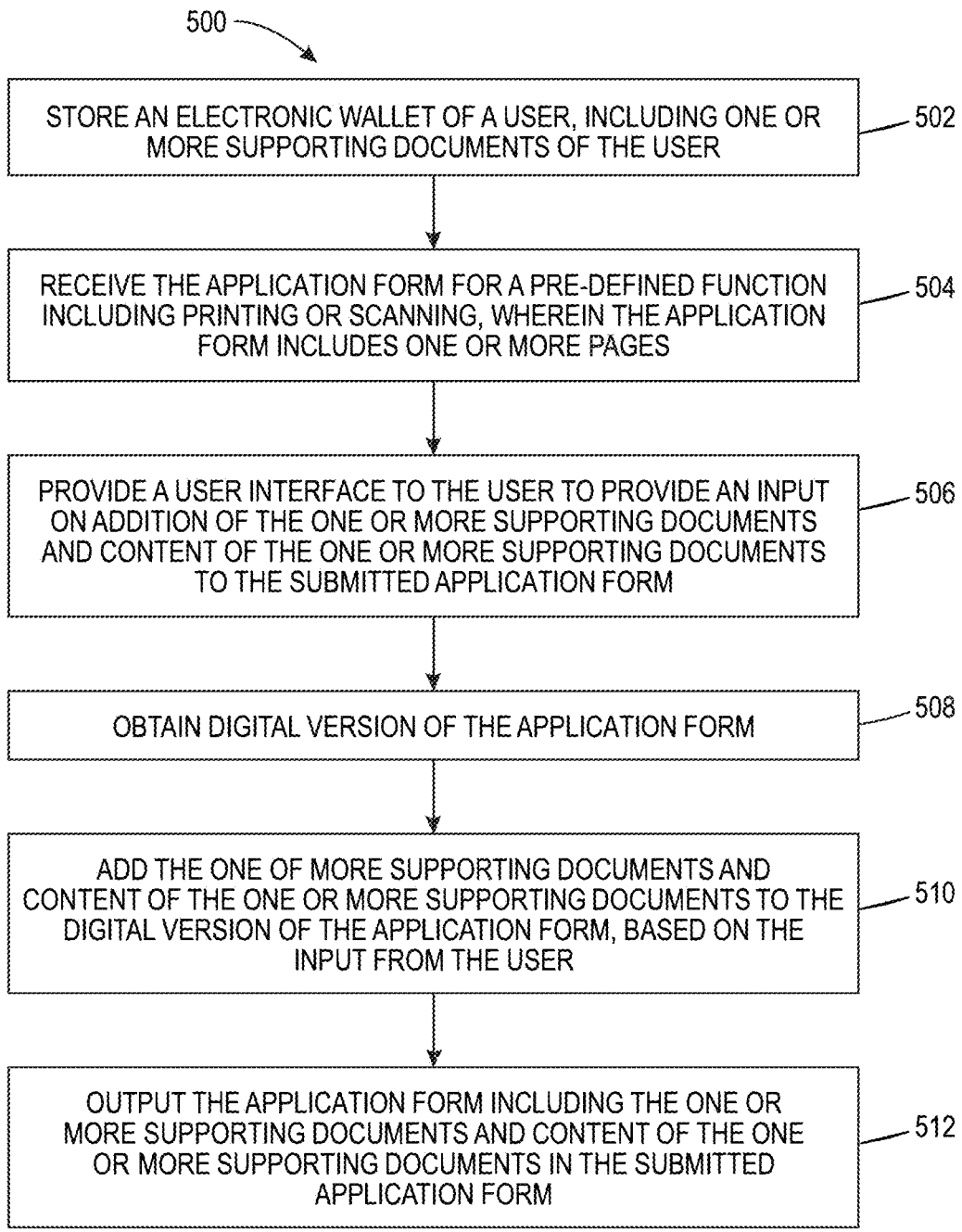
FIG. 5 is a method flowchart for directly adding one or more supporting documents and content of the one or more supporting documents to an application form, in accordance with an embodiment of the present disclosure.

FIG. 5 is a method flowchart to allow a user to directly add one or more supporting documents and content of the one or more supporting documents to an application form. The method 500 may be implemented at a multi-function device, such as the multi-function device 102 of FIG. 1, or the multi-function device 200 of FIG. 2A, or the multi-function device 240 of FIG. 2B. However, the method 500 may be implemented at any equivalent device with scanning, printing, form processing functionalities, and so on.

The method 500 begins when a user wishes to add one or more supporting documents to an electronic wallet integrated with the multi-function device. Thus, the user visits the multi-function device and authenticates himself at the multi-function device using any known methods, such as scanning his ID card, using his employee ID and password, etc. Once authenticated, the multi-function device displays various options such as scan, scan to email, scan to cloud, or the like. In the context of the disclosure, the multi-function device displays a new option, say "e-wallet" option to allow the user to add one or more supporting documents in the electronic wallet. Thereafter, the user selects the new option and adds supporting documents to the electronic wallet. At 502, the electronic wallet with one or more supporting documents of the user is stored. This way, the supporting documents are stored and maintained in the electronic wallet for later retrieval, use and/or access. Further, while/before storing, the supporting documents are encrypted using one or more known encryption algorithms or later developed algorithms. Encrypting the supporting documents ensures that the documents or any content of the electronic wallet cannot be accessed by any unauthorized user/software/device and further ensures that the personal information of the user is secured.

Later, the user submits an application form at the multi-function device and the application form may be a multi-page application form. The user may submit the application form in physical form, i.e., physical application form printed on paper, or may submit the application form in digital form, i.e., electronic application form. In case of the physical application form, the user submits the application form directly at the multi-function device. In other cases, the user submits the application form via his computing device or via using internet services such as CentreWare Internet Services (CWIS). Here, the user submits the physical application form at the multi-function device for a pre-defined function including printing or scanning. Once submitted, at block 504, the application form is received at the multi-function device. In one example, the application form is duly signed. In another example, the application form is partially filled. Thereafter, the user authenticates himself at the multi-function device using any known methods, such as scanning his ID card, using his employee ID and password, etc.

Once authenticated, at 506, a user interface is presented to the user to provide input on the addition of the one or more supporting documents and content of the one or more supporting documents to the submitted application form. The user interface displays multiple options to allow the user to provide the input. Exemplary options include options to allow the user to specify whether only the supporting document or both the supporting documents and the content of the supporting documents are required to be added, options to allow the user to specify different supporting documents that are required to be added, pages of the application form on which the supporting documents are required to be added, and pages of the application form where the content of the supporting documents are required to be added, and so on. Once presented, the user provides input on the addition of the one or more supporting documents and the content of the one or more supporting documents. Once the user provides the input on the addition of the one or more supporting documents and content of the one or more supporting documents, the user selects an option, say proceed or scan option. Thereafter, the multi-function device initiates processing.

Once initiated, at 508, a digital version of the application form is obtained. Here, as the physical application form is submitted at the multi-function device, thus scanning is performed and a scanned application form, i.e., digital version of the application form is obtained. Alternatively, if the digital version of the application form is submitted from the computing device, then the digital version of the application form is obtained directly. This way, the digital version of the application form is obtained.

Once obtained, the multi-function device analyzes the user input to identify that both the supporting document as well as the content of the supporting documents are required to be added. Thus, all the supporting documents requested by the user are identified, i.e., supporting documents that are required to be added and the supporting documents from which the content is required to be added, and the identified documents are retrieved from the electronic wallet. Once retrieved, the retrieved supporting documents and the scanned application form are analyzed. The multi-function device analyzes the scanned application form and the supporting documents to extract information from the scanned application form and the supporting documents. Here, only the supporting documents from which the content is required to be added are analyzed. Further, the multi-function device only analyzes and extracts the information from the pages of the application form in which the details of the supporting documents are required to be added. Further, the multi-function device extracts the fields from the scanned application form, i.e., the fields which are required to be filled or auto-filled, and content from the supporting documents which are required to be added. In addition, the multi-function device also extracts other details provided on the application form, e.g., organization name, form name, form ID, form type, form reference number, etc. Similarly, the multi-function device extracts other details provided on the supporting documents, e.g., type of supporting document, i.e., whether the supporting document is a driving license, a PAN card, passport, or the like, expiration date of the supporting document, etc. Post successful extraction, the multi-function device obtains the extracted content (fields of the application form and other information) of the application form and the extracted content (details and other information) of the supporting document. Thereafter, the multi-function device identifies the correspondence between the fields extracted from the application form and the details extracted from the supporting documents. To accomplish this, the multi-function device first identifies the type of the supporting document and various details present in the supporting documents. In one example, the multi-function device may identify the type of the supporting document based on the extracted content such as the name of the document. In another example, the multi-function device may identify the type of the supporting document by comparing the supporting document with pre-stored templates of the multiple supporting documents. Once the type of the supporting document is identified, i.e., whether the supporting document is an SSN card, a driving license, passport, etc., the multi-function device recognizes specific details extracted from the supporting document, i.e., whether the extracted content is a driving license number, an SSN, name of the user, etc. The multi-function device is trained to recognize the extracted details. For example, once the multi-function device identifies that the supporting document is a driving license, the multi-function device automatically identifies that the 10-digit alphanumeric string present on the driving license is the driving license number. This way, the multi-function device obtains information related to the details extracted from the supporting documents, i.e., whether the detail is a user's name, or user's date of birth, SSN, etc. Once extracted, the details are saved for future use, i.e., while adding the details in other application forms or documents.

Similarly, the multi-function device identifies information related to the fields extracted from the application form. The multi-function device analyzes the content extracted from the application form and identifies the type of the field, i.e., whether the field relates to the name of the user, or the name of the user's father, SSN, etc. For example, after analyzing the content extracted from the scanned pages of the application form, the multi-function device identifies that the field "Applicant' Name" relates to the name of the user, "Age" relates to the date of birth of the user, or the like. This way, the multi-function device obtains the information related to the fields extracted from the application form, i.e., whether the field relates to user's name, or the user's date of birth, SSN, etc.

Once the details are extracted from the supporting documents and the information related to the extracted details are obtained, and fields extracted from the application form and information related to the extracted fields are obtained, at 510, the details extracted from the supporting documents are added to the application form. To this end, the multi-function device first identifies the correlation between the details extracted from the supporting document and the fields extracted from the application form. Thereafter, the multi-function device adds the details/content of the supporting documents to the application form based on the user input. Further, at 510, once the content is added, the supporting documents are added to the scanned application form. The multi-function device adds the supporting documents to the scanned application form based on the user input. In one example, after adding the details, the multi-function device automatically adds the supporting document as a consecutive page in the output application form. For instance, if details of the SSN card are added on the $3^{rd}$ page of the application form, then the SSN card is added as the $4^{th}$ page. In another example, after adding the details, the multi-function device adds the supporting documents at the end of the scanned application form. For instance, in a 5-page application form, if details of the SSN card are added on the $2^{nd}$ page of the application form, then the SSN card is added after the $5^{th}$ page of the application form.

Once the one or more supporting documents (including documents from which content are required to be added and documents for which only the document is required to be added and not the content) and the content of the one or more supporting documents are added to the submitted application form, at 512, an output application form is generated. The output application form is generated by adding one or more supporting documents and details present in the supporting documents, to the scanned application form, based on the user input.

Once generated, a preview of the document is displayed to the user. The displayed preview may include all the pages of the output document so that the user can review the output document and details filled corresponding to various fields. Thereafter, the user can take any desired action, such as, share the document with one or more other users by entering email addresses, save the document on a cloud location, or the like. Further, the user can print the document by simply placing the print request. Thereafter, the user can sign the application form and send it to the desired organization for submission.

The data stored in the electronic wallet or supporting documents of the user at the multi-function are secured using one or more encryption algorithms. The supporting documents or data stored in the electronic wallet are stored in an encrypted form such that they cannot be accessed by anyone without needed permission/verification. Data stored in the electronic wallet or any supporting documents stored at the multi-function device are encrypted such that they cannot be accessed at the multi-function device. An option such as enable data encryption is included in the user interface and the option is provided to the user before accessing the electronic wallet or storing the supporting documents at the multi-function device. The option ensures that the electronic wallet or its content is encrypted before storing. In case the user disables the option, access to the electronic wallet is not provided to the user. This implementation ensures the user's electronic wallet and/or supporting documents are secured.

In some implementations, memory of the multi-function device is overwritten once supporting documents and/or electronic wallets are removed from the multi-function device. This ensures that once any supporting documents or electronic wallets stored at the multi-function device are deleted/removed, the document or e-wallet cannot be accessed or retrieved.

The disclosure can be implemented for any organization such as banks, hospitals, schools, passport offices, etc. For example, a multi-function device such as 102 can be placed in an organization where users can first store their supporting documents and once stored, the user can add one or more pre-stored supporting documents and/or content of the one or more supporting documents to any number of application forms. In some implementations, the disclosure can be implemented for individual users. For example, a multi-function device such as 102 can be placed in a home, where a user can use the multi-function device 102 each time before submitting the application form at an organization. This ensures convenience to the user as the user is not required to scan and add the supporting documents multiple times. Further, this ensures that the content filled in the application form matches the content present in the supporting documents. These are a few examples, but the disclosure can be implemented by any organization, individual users, etc., without limiting the scope of the disclosure.

The present disclosure discloses methods and systems for adding one or more supporting documents and/or content of the one or more supporting documents to an application form. The methods and systems allow a user to easily store supporting documents in the multi-function device in advance and add the supporting documents to multiple application forms. Thus, the methods and systems offer convenience to the user and save a lot of time and effort of the user. Further, the methods and systems allow a user to add the content of the supporting documents to the application forms, thus the current solution ensures that the details filled in the application form are accurate.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, extracting, adding, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for integrating an electronic wallet with a multi-function device, the method comprising:
    storing the electronic wallet with one or more supporting documents of a user;
    receiving an application form for a pre-defined function comprising printing or scanning, wherein the application form comprising one or more pages;
    providing a user interface to the user to provide an input on addition of the one or more supporting documents to the submitted application form;
    processing the received application form;
    based on the input from the user, adding the one or more supporting documents or content of the one or more supporting documents to the submitted application form; and
    outputting the application form comprising the one or more supporting documents or content of the one or more supporting documents in the submitted application form.

2. The method of claim 1, wherein the input comprising at least: one or more pages of the application form where the one or more supporting documents are to be added and selection of the one or more supporting documents for addition.

3. The method of claim 1, further comprising, authenticating the user for addition of the one or more supporting documents to the submitted application form.

4. The method of claim 1, further comprising, retrieving the one or more supporting documents from the electronic wallet based on the input from the user.

5. The method of claim 1, further comprising, adding the one or more supporting documents to the application form based on the input from the user.

6. The method of claim 1, further comprising, extracting content from the one or more supporting documents based on the input from the user.

7. The method of claim 6, further comprising, adding the extracted content in the application form based on the input from the user.

8. The method of claim 1, further comprising, allowing the user to at least: access or update the electronic wallet based on the authentication of the user.

9. The method of claim 1, further comprising, encrypting the one or more supporting documents stored in the electronic wallet before/while storing at the multi-function device.

10. The method of claim 1, further comprising, checking a pre-defined encryption option before providing access to the electronic wallet and/or the one or more supporting documents to the user.

11. The method of claim 10, further comprising, disallowing access to the electronic wallet and/or the one or more supporting documents if the pre-defined encryption option is disabled.

12. The method of claim 1, further comprising, overwriting a memory of the multi-function device storing the electronic wallet or the one or more supporting documents of the user in at least one of situations: when the electronic wallet is removed from the multi-function device or the one or more supporting documents are removed from the multi-function device.

13. A multi-function device for integrating an electronic wallet at the multi-function device, the multi-function device comprising:
   a memory for storing the electronic wallet comprising one or more supporting documents of a user in a pre-defined format; a user interface provided to the user to provide an input on addition of the one or more supporting documents to an application form;
   a controller for:
      receiving the application form for a pre-defined function comprising printing or scanning, wherein the application form comprising one or more pages;
      processing the received form;
      based on the input from the user, adding the one or more supporting documents or content of the one or more supporting documents to the submitted application form; and
      outputting the application form comprising the one or more supporting documents and/or content of the one or more supporting documents in the submitted application form.

14. The multi-function device of claim 13, wherein the output comprises a printed application form or a scanned application form.

15. The multi-function device of claim 13, wherein the input comprising at least: one or more pages of the application form where the one or more supporting documents are to be added and selection of the one or more supporting documents for addition.

16. The multi-function device of claim 13, wherein the controller authenticates the user for the addition of the one or more supporting documents to the submitted application form.

17. The multi-function device of claim 13, wherein the controller retrieves the one or more supporting documents from the electronic wallet based on the input from the user.

18. The multi-function device of claim 13, wherein the controller adds the one or more supporting documents to the application form based on the input from the user.

19. The multi-function device of claim 13, wherein the controller extracts content from the one or more supporting documents based on the input from the user.

20. The multi-function device of claim 19, wherein the controller adds the extracted content in the application form based on the input from the user.

21. The multi-function device of claim 13, wherein the controller allows the user to at least: access or update the electronic wallet based on the authentication of the user.

22. The multi-function device of claim 13, wherein the controller encrypts the one or more supporting documents stored in the electronic wallet before/while storing at the multi-function device.

23. The multi-function device of claim 13, wherein the controller checks a pre-defined encryption option before providing access to the electronic wallet and/or the one or more supporting documents to the user.

24. The multi-function device of claim 23, wherein the controller disallows access to the electronic wallet and/or the one or more supporting documents if the pre-defined encryption option is disabled.

25. The multi-function device of claim 13, wherein the controller overwrites a memory of the multi-function device storing the electronic wallet or the one or more supporting documents of the user in at least one of situations: when the electronic wallet is removed from the multi-function device or the one or more supporting documents are removed from the multi-function device.

26. A device for allowing a user to directly add one or more supporting documents to an application form, the device is for:
   storing an electronic wallet of a user, comprising one or more supporting documents of the user;
   receiving the application form for a pre-defined function comprising printing or scanning, wherein the application form comprising one or more pages;
   providing a user interface to the user to provide an input on addition of the one or more supporting documents to the submitted application form;
   scanning the received application form;
   based on the input from the user, adding the one or more supporting documents and/or content of the one or more supporting documents to the submitted application form; and
   outputting the application form comprising the one or more supporting documents or content of the one or more supporting documents in the submitted application form.

27. The device of claim 26, wherein the input comprising at least: one or more pages of the application form where the one or more supporting documents are to be added and selection of the one or more supporting documents for addition.

28. The device of claim 26 adds the one or more supporting documents or content of the one or more supporting documents to the application form based on the input from the user.

29. The device of claim 26 encrypts the one or more supporting documents stored in the electronic wallet before/while storing at the device.

30. The device of claim 26 disallows access to the electronic wallet and/or the one or more supporting documents if a pre-defined encryption option is disabled.

31. The device of claim 26 overwrites a memory storing the electronic wallet or the one or more supporting documents of the user in at least one of situations: when the electronic wallet is removed from the device or the one or more supporting documents are removed from the device.

* * * * *